(12) United States Patent
Khalid

(10) Patent No.: US 11,218,935 B2
(45) Date of Patent: Jan. 4, 2022

(54) NETWORK LOAD MANAGEMENT METHODS AND APPARATUS

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 34 days.

(21) Appl. No.: 16/706,264

(22) Filed: Dec. 6, 2019

(65) Prior Publication Data

US 2021/0176686 A1    Jun. 10, 2021

(51) Int. Cl.
| | |
|---|---|
| H04W 4/00 | (2018.01) |
| H04W 36/22 | (2009.01) |
| H04W 88/06 | (2009.01) |
| H04W 28/08 | (2009.01) |
| H04W 28/02 | (2009.01) |
| H04W 36/14 | (2009.01) |

(52) U.S. Cl.
CPC ....... *H04W 36/22* (2013.01); *H04W 28/0284* (2013.01); *H04W 28/08* (2013.01); *H04W 36/14* (2013.01); *H04W 88/06* (2013.01)

(58) Field of Classification Search
CPC ............. H04W 36/22; H04W 36/0066; H04W 28/0284; H04W 28/0289; H04W 28/08; H04W 36/14; H04W 36/00837; H04W 36/0022; H04W 88/06
USPC ....................................................... 370/329
See application file for complete search history.

(56) References Cited

U.S. PATENT DOCUMENTS

2013/0077482 A1*  3/2013  Krishna ................ H04W 36/22
                                                               370/230
2018/0343601 A1* 11/2018  Livanos ................ H04L 47/122

* cited by examiner

*Primary Examiner* — Huy C Ho
(74) *Attorney, Agent, or Firm* — Straub & Straub; Michael P. Straub; Stephen T. Straub

(57) ABSTRACT

A Narrow Band-Internet of Things (NB-IoT) communications link between a wireless access point of a non-cellular network and a cellular base station of a cellular network is implemented and used to support load management operations in a communications system including a cellular network and a non-cellular network. A service management system uses UE performance information and network statistics communicated over the NB-IoT communications link to evaluate network loading with regard to congestion in the non-cellular network. The session management system initiates a communications session for congestion control to offload a session from a congested network to a less congested network. The NB-IoT link is used to communicate session handoff related signaling.

21 Claims, 24 Drawing Sheets

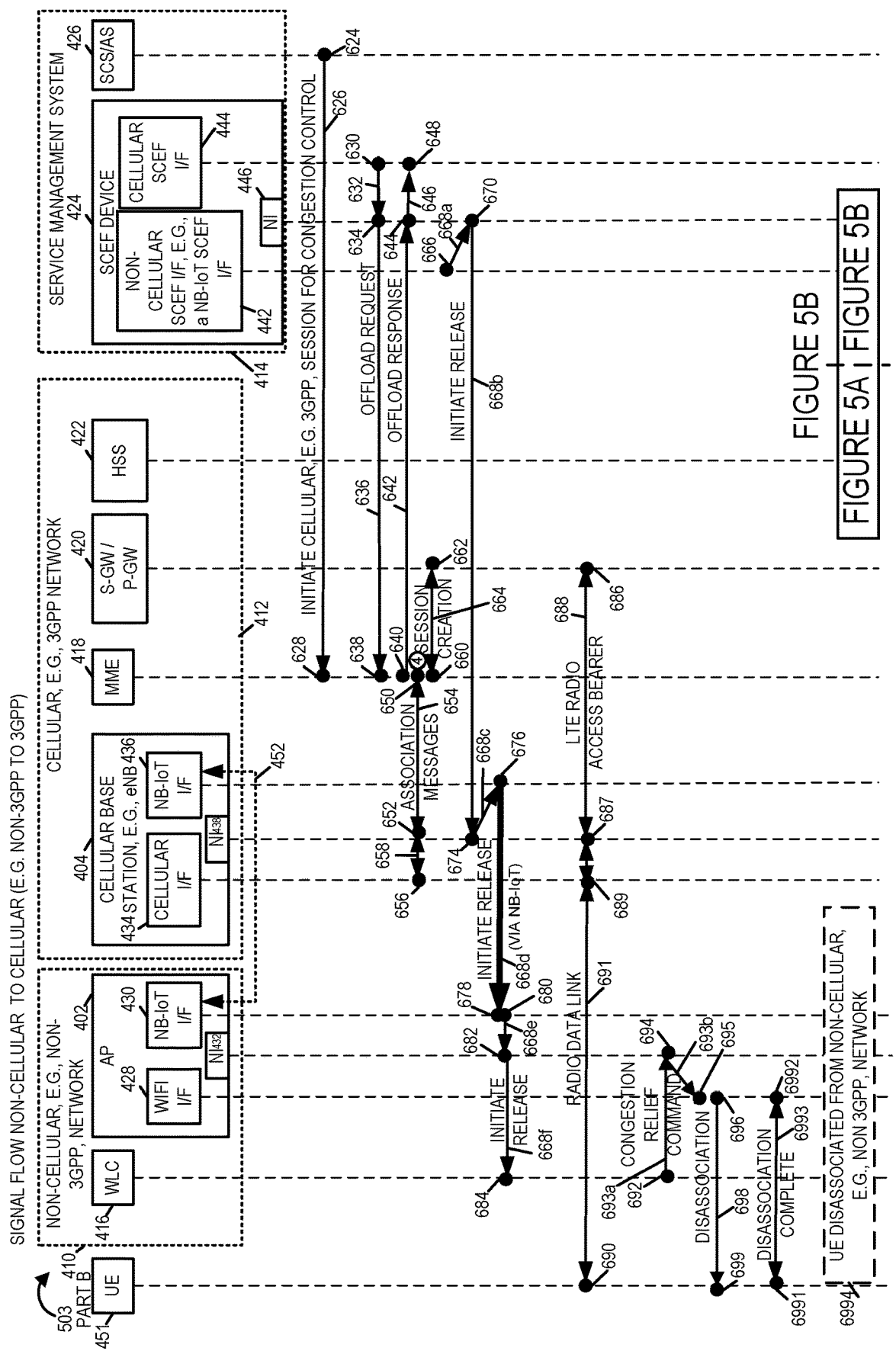
FIGURE 5A | FIGURE 5B

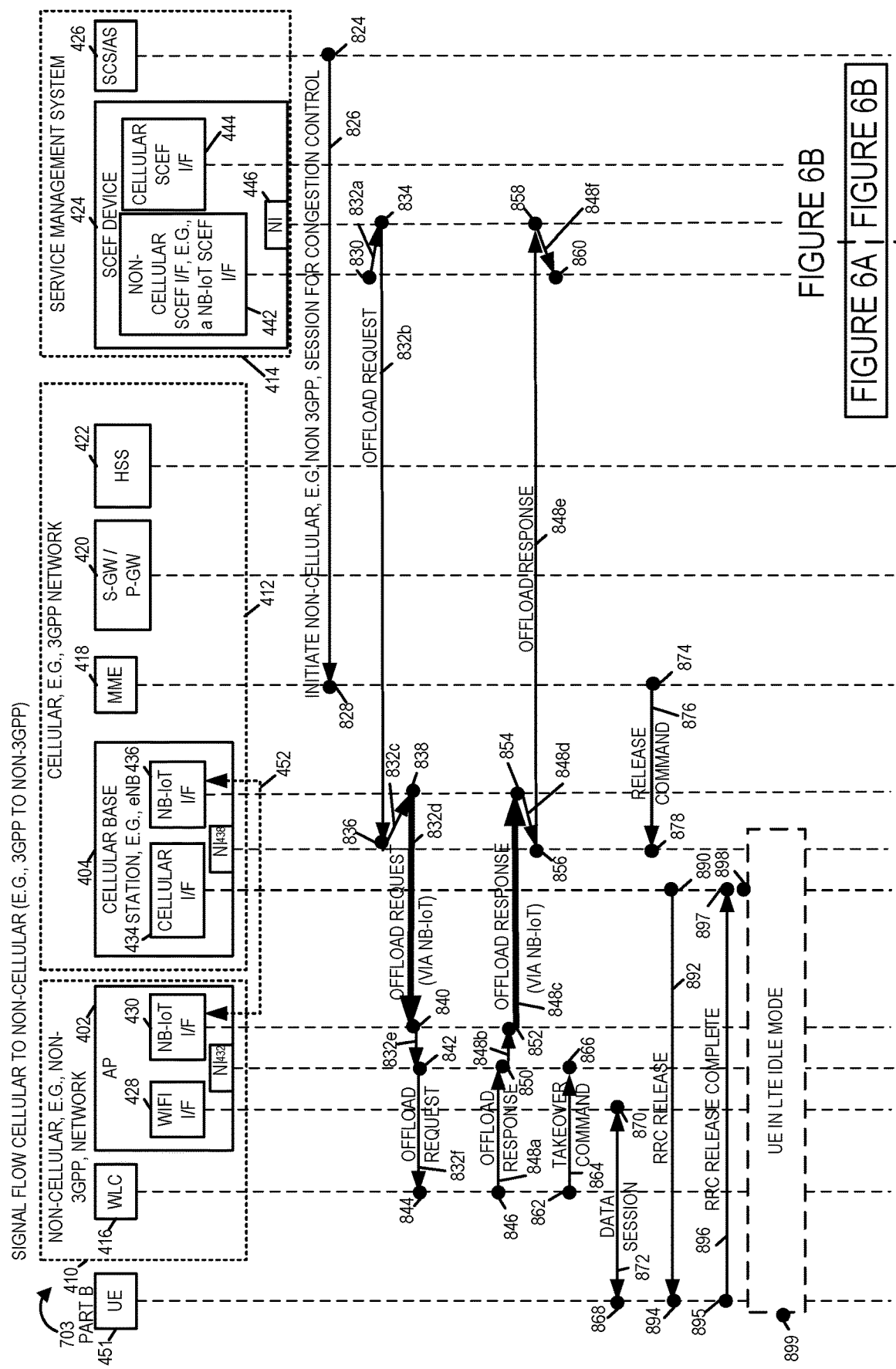

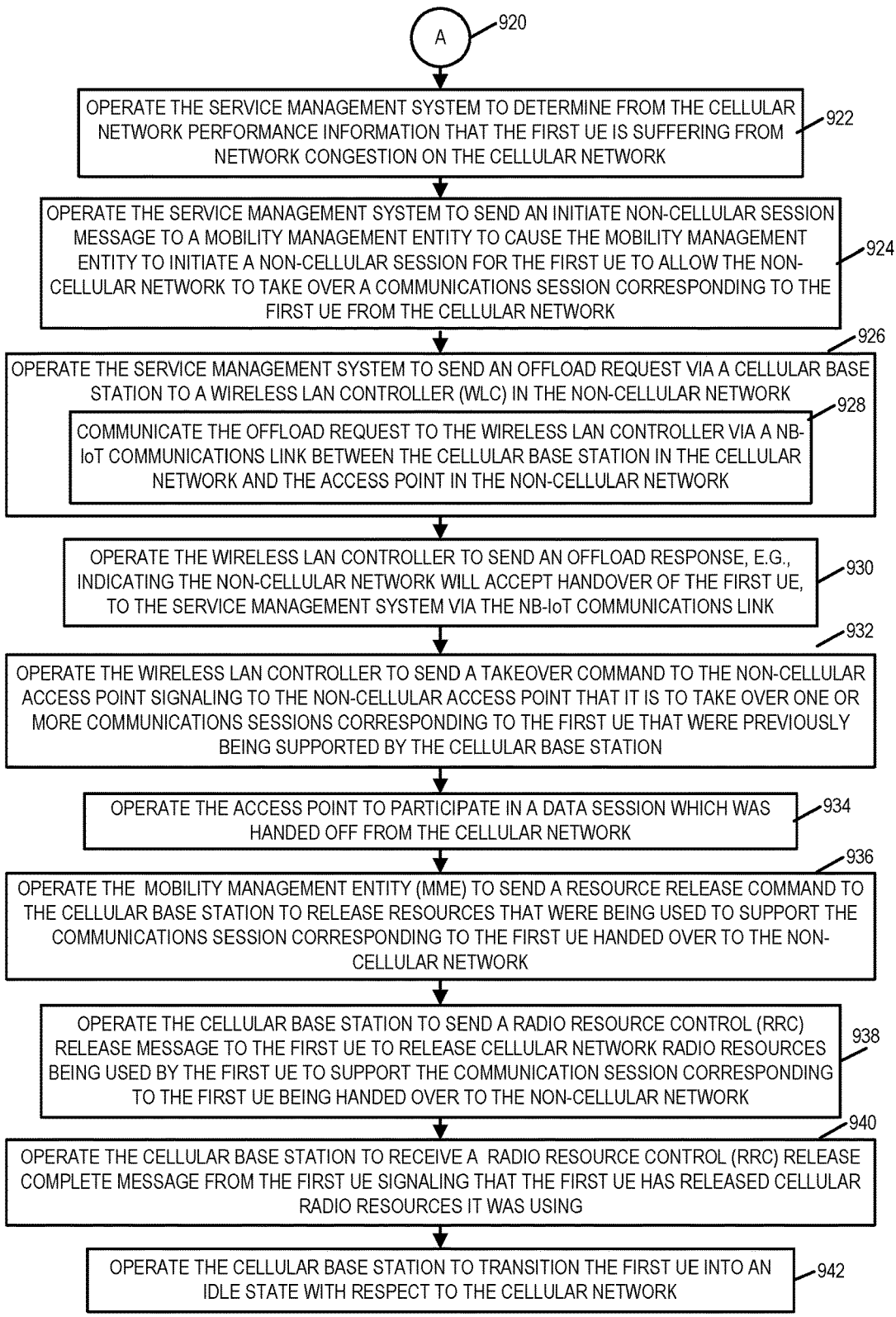

2100

ASSEMBLY OF COMPONENTS
(INCLUDED IN A WLC OF A NON-CELLULAR NETWORK)

COMPONENT CONFIGURED TO OPERATE THE WLC TO RESPOND TO SAID RESOURCE RELEASE MESSAGE BY OPERATING THE WLC TO SIGNAL THE ACCESS POINT SERVING THE FIRST UE DEVICE TO RELEASE COMMUNICATIONS RESOURCES BEING USED BY THE FIRST UE DEVICE, E.G. OPERATE THE WLC TO SEND A CONGESTION RELIEF COMMAND TO THE ACCESS POINT — 2102

COMPONENT CONFIGURED TO OPERATE THE WLC TO SEND AN OFFLOAD RESPONSE, E.G., AN OFFLOAD RESPONSE INDICATING THAT THE NON-CELLULAR NETWORK WILL ACCEPT THE HAND OVER OF THE FIRST UE DEVICE, TO THE SERVICE MANAGEMENT SYSTEM VIA THE NB-IoT COMMUNICATIONS LINK — 2104

COMPONENT CONFIGURED TO OPERATE THE WLC TO SEND A TAKEOVER COMMAND TO THE NON-CELLULAR ACCESS POINT SIGNALING TO THE NON-CELLULAR AP THAT IT IS TO TAKE OVER ONE OR MORE COMMUNICATIONS SESSIONS CORRESPONDING TO THE FIRST UE DEVICE THAT WERE PREVIOUSLY BEING SUPPORTED BY THE CELLULAR BASE STATION — 2106

ASSEMBLY OF COMPONENTS
(INCLUDED IN AN ACCESS POINT SUPPORTING NB-IoT COMMUNICATIONS, E.G. A WIFI AP SUPPORTING NB-IoT COMMUNICATIONS, OF A NON-CELLULAR NETWORK)

COMPONENT CONFIGURED TO OPERATE THE ACCESS POINT TO SUPPORT A NB-IoT COMMUNICATIONS LINK BETWEEN THE ACCESS POINT OF THE NON-CELLULAR NETWORK AND A CELLULAR BASE STATION OF A CELLULAR NETWORK, E.G. FOR USE IN NETWORK LOAD MANAGEMENT AND/OR FACILITATING UE SESSION HANDOFFS BETWEEN THE CELLULAR NETWORK AND THE NON-CELLULAR NETWORK — 2202

COMPONENT CONFIGURED TO OPERATE THE ACCESS POINT TO PARTICIPATE IN A DATA SESSION WHICH WAS HANDED OFF FROM THE CELLULAR NETWORK — 2204

FIGURE 20

NETWORK LOAD MANAGEMENT METHODS AND APPARATUS

FIELD

The present application relates to communications methods and apparatus, and more particularly, to methods and apparatus for detecting and/or responding to network congestion in a communications system including cellular and non-cellular networks, e.g., using a Narrow Band-Internet of Things (NB-IoT) communications link between a wireless access point of a non-cellular network and a cellular base station of a cellular network.

BACKGROUND

Cellular networks and non-cellular networks that are located in the same coverage area typically not directly coupled together. The cellular network is typically not aware of the current level of congestion in the non-cellular network, and the non-cellular network is typically not aware of the current level of congestion in the cellular network. At different times one network may be heavily loaded and the other may be lightly loaded. Due to the lack of communications between the two networks, uneven distribution of customers and/or network load can, and sometimes does, result in capacity congestion and/or inefficient utilization of available network resources.

Based on the above, there is a need for new methods and apparatus to facilitate load management in communications systems in which alternative networks are available to users. In particular it would be desirable if methods and/or apparatus could be developed which would allow different networks to communicate load and/or handoff related information without the need for building physical hardwired interconnects between the different networks for exchanging such information.

SUMMARY

Methods and Apparatus for using a Narrow Band-Internet of Things (NB-IoT) communications link between a wireless access point of a non-cellular network and a base station of a cellular network to support detection of network congestion affecting a user equipment (UE), e.g., in the non-cellular network, and the handoff between the non-cellular network and the cellular network in the event of network congestion are described.

In various embodiments a service management system with communications connectivity to components of a cellular network also has communications connectivity to components in a non-cellular, e.g., WiFi network, via a NB-IoT communications link between a base station in the cellular network and an access point, e.g., WiFi access point, in the non-cellular network.

In some embodiments the service management system includes a Service Capability Server (SCS) and/or Application Server (AS) which may be, and sometimes are, integrated into a single device referred to as an SCS/AS. In order to facilitate interaction with the components of the non-cellular network and cellular network, the system management system includes a cellular service capabilities exposure function (cellular SCEF) interface and a non-cellular services capability exposure function (non-cellular SCEF) interface. The server or servers of the service management system interact with components of the cellular network via the cellular SCEF interface while the server or servers of the system management system interact with components of the non-cellular, e.g., WiFi network, via the non-cellular SCEF interface. The non-cellular network interface is sometimes referred to as an NB-IoT SCEF interface since communications with the non-cellular network traverse the NB-IoT communications link between the base station of the cellular network which supports NB-IoT communication and the access point of the non-cellular network which supports NB-IoT communications. In addition to supporting NB-IoT communications the cellular base station supports cellular communications sometimes referred to as 3GPP communications. The non-cellular network access point, e.g. WiFi access point, supports WiFi or another non-cellular communications protocol in addition to the NB-IoT communications link.

UEs are provided services by access points in the non-cellular network via the non-cellular communications link while the NB-IoT link between the AP and base station is used to communicate network performance information and handover related information between the non-cellular network and the cellular network. While the service management system could be located in either of the non-cellular or cellular networks in various embodiments it is located in the cellular network. However, in other embodiments it is located in the non-cellular network.

The service management system receives network performance information relating to one or more UEs. The information can be, and sometimes is, communicated in response to a request. In the case where the service management system is located in the cellular network, non-cellular network performance information is requested via the NB-IoT link. Similarly, the performance information is communicated back to the service management system via the NB-IoT link in such embodiments.

Handoffs can be, and sometimes are, initiated, e.g., in response to the service management system detecting congestion affecting a UE obtaining service from the non-cellular network, to switch a UE from using non-cellular wireless communications services via an access point in the non-cellular network to using cellular wireless communications services. Alternatively handoffs can be, and sometimes are, initiated, e.g., in response to the service management system detecting congestion affecting a UE obtaining service from the cellular network, to switch a UE from using cellular wireless communications services via a base station in the cellular network to using non-cellular wireless communications services obtained via an access point in the non-cellular network.

Information about a UE and/or an ongoing session or resources needed for a session are communicated from one network to the other over the NB-IoT link between the base station and access point to facilitate smooth and reliable handoffs. By communicating information over the NB-IoT link the service management system can ensure that the UE will be able to receive the services it desires in the network to which the handoff is occurring before the handoff is completed.

In this way the NB-IoT connection allows not only for intelligent decisions as to when handoffs should be implemented for a UE from one network to another but can also facilitate a smooth and reliable handoff when a decision is made to switch between which network is to provide service to a particular UE.

An exemplary communications method, in accordance with some embodiments, comprises: operating a service management system to receive first network performance information (e.g., key performance indicators and/or non-cellular network statistics) from a non-cellular network (e.g., WiFi network) providing performance information relating to a first user equipment (UE) device; operating the service management system to initiate a cellular (e.g., a 3GPP) communications session for the first user equipment device; and operating the service management system to initiate release of non-cellular network resources following establishment of a cellular communications session for said first UE device.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURES

FIG. 5B is a second part of a drawing illustrating elements of exemplary system of FIG. 4 and exemplary steps and signaling flows for an example including detected congestion on a non-cellular network, e.g., a non-3GPP network, by a service provider management system and controlled transition of a communications session to a cellular network, e.g., a 3GPP network, in accordance with an exemplary embodiment, wherein some of the signaling related to network load management is communicated via a NB-IoT wireless communications link between a base station, e.g., an eNodeB, in the cellular network and an access point, e.g. a WiFi AP, in the non-cellular network.

FIG. 5 comprises the combination of FIG. 5A and FIG. 5B.

FIG. 6B is a second part of a drawing illustrating elements of exemplary system of FIG. 4 and exemplary steps and signaling flows for an example including detected congestion on a cellular network, e.g., a 3GPP network, by a service provider management system and controlled transition of a communications session to a non-cellular network, e.g., a 3GPP network, in accordance with an exemplary embodiment, wherein some of the signaling related to network load management is communicated via a NB-IoT wireless communications link between a base station, e.g., an eNodeB, in the cellular network and an access point, e.g. a WiFi AP, in the non-cellular network.

FIG. 6 comprises the combination of FIG. 6A and FIG. 6B.

FIG. 7B is a second part of a flowchart of an exemplary communications method in accordance with an exemplary embodiment.

FIG. 7 comprises the combination of FIG. 7A and FIG. 7B.

FIG. 19 is a drawing of an exemplary assembly of components which may be included in a wireless location area network controller (WLC) in accordance with an exemplary embodiment.

FIG. 20 is a drawing of an exemplary assembly of components which may be included in an access point (AP), e.g., a WiFi access point (AP), supporting Narrow Band-Internet of Things (NB-IoT) communications in accordance with an exemplary embodiment.

DETAILED DESCRIPTION

Figure 1:
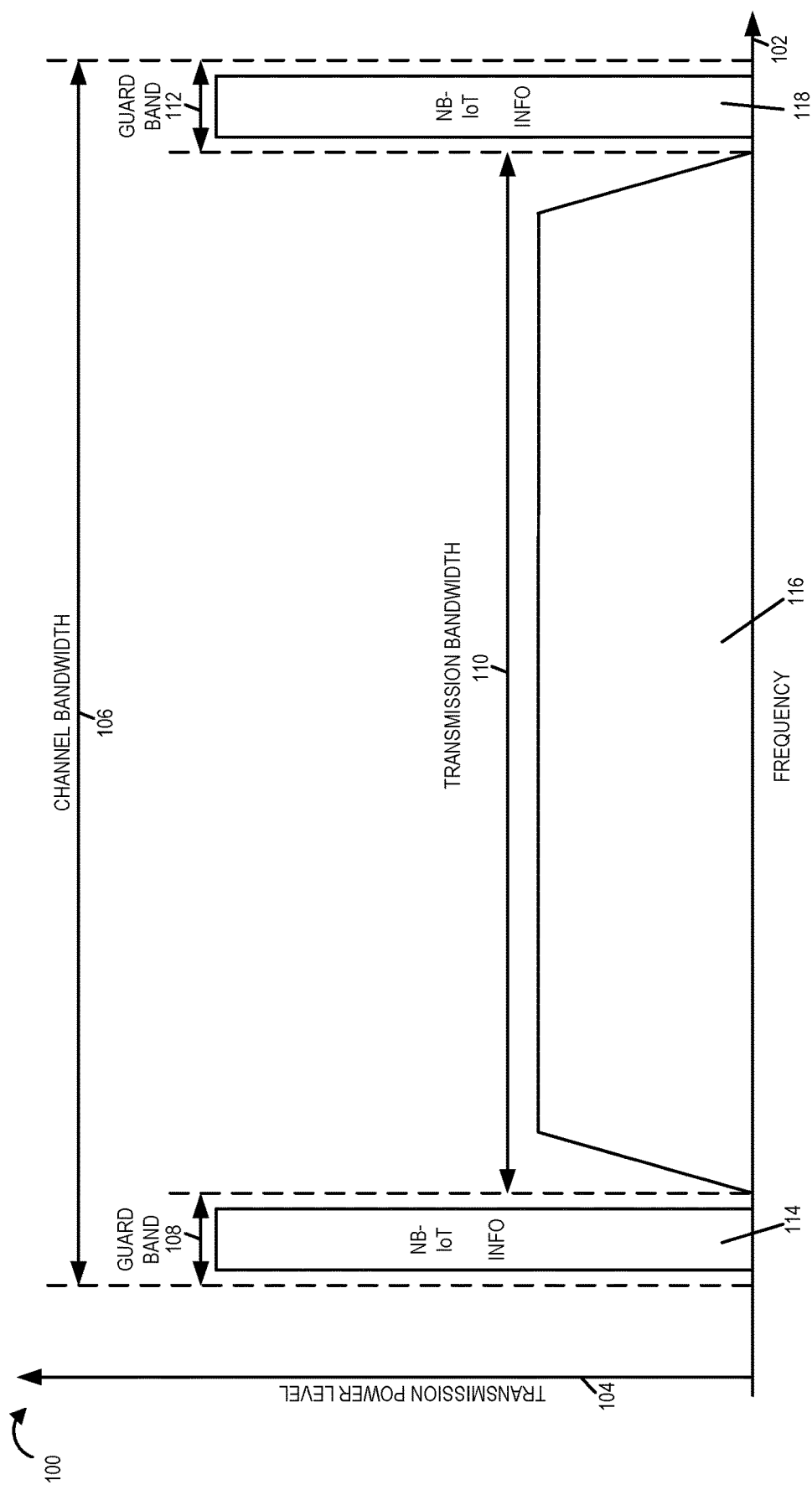
FIG. 1 illustrates an exemplary NB-IoT implementation in guard bands, e.g., of a Citizens Broadband radio Services Device (CBSD) Priority Access License (PAL), in which information related to offloading a UE from a non-cellular network to a cellular network and/or information related to offloading a UE from a cellular network to a non-cellular network, may be, and sometimes is, communicated in the guard bands using NB-IoT signaling, in accordance with an exemplary embodiment.

FIG. 1 illustrates an exemplary NB-IoT implementation in guard bands, e.g., of a Citizens Broadband radio Services Device (CBSD) Priority Access License (PAL), in which information related to offloading a UE from a non-cellular network to a cellular network and/or information related to offloading a UE from a cellular network to a non-cellular network, may be, and sometimes is, communicated in the guard bands using NB-IoT signaling, in accordance with an exemplary embodiment. Drawing 100 of FIG. 1 includes horizontal axis 102 representing frequency and vertical axis 104 representing transmission power level. Exemplary channel bandwidth 106 includes guard band 108 transmission bandwidth 110 and guard band 112. Traditional network signaling, e.g., cellular network signals, including e.g. CBRS signals, are conveyed via resource 116 corresponding to transmission bandwidth 110.

NB-IoT is a Frequency Division Duplex (FDD) based technology and will not work with CBRS (A Time Division Duplex (TDD) Technology) using the typical transmission bandwidth 110. In order to make NB-IoT work with TDD, two separate frequency bands are needed, this isolation is provided by two guard bands (108, 112) at the opposite ends of the channel bandwidth spectrum 106. NB-IoT signaling, e.g., conveying requests for UE Key Performance Indicators (KPIs) and network statistics, reports communicating UE KPIs and network statistics, initiate release messages, offload requests and offload responses, is conveyed via resource 114 corresponding to guard band 108 and resource 118 corresponding to guard band 112.

Figure 2:
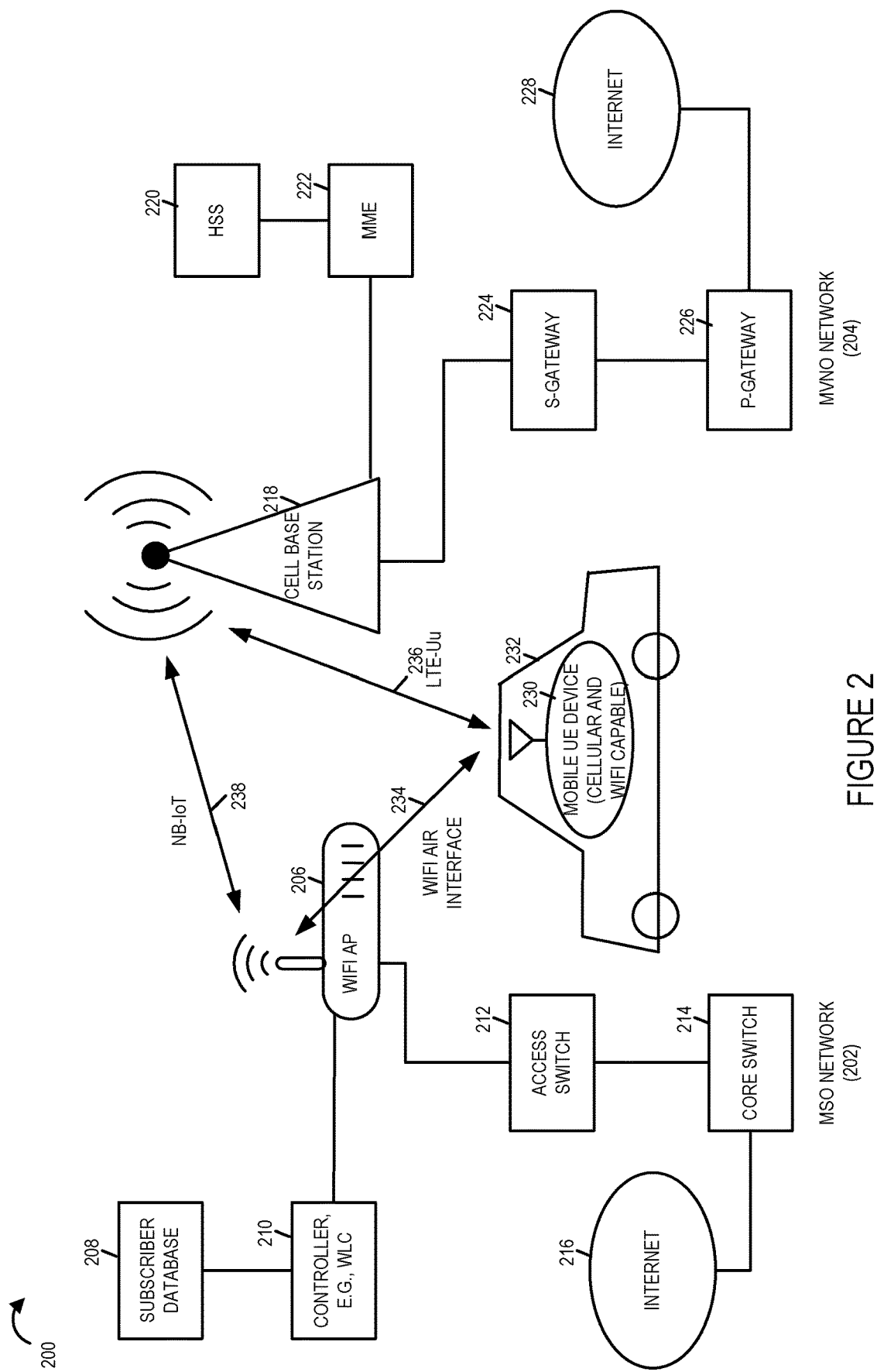
FIG. 2 is a drawing of an exemplary communications system in accordance with an exemplary embodiment.

FIG. 2 is a drawing of an exemplary communications system 200 in accordance with an exemplary embodiment. Exemplary communications system 200 includes a multiple system operator (MSO) network 202 and a mobile virtual network operator (MVNO) network 204. MSO network 202 includes a WiFi Access Point (AP) 206, a subscriber database 208, a controller 210, e.g., a Wireless Local area network controller (WLC), an access switch 212, a core switch 214 and Internet 216, coupled together as shown in FIG. 2. MVNO network 204 includes a cellular base station 218, e.g., a LTE base station, a Home Subscriber Server (HSS) 220, a Mobility Management Entity (MME) 222, a S-Gateway 224, a P-Gateway 226, and Internet 228 coupled together as shown in FIG. 2 shows an exemplary communications system 200 further includes a plurality of user equipment (UE) devices including mobile UE device 230, which is currently located in vehicle 232. Mobile UE device 230 includes cellular, e.g., LTE, and WiFi capabilities. Mobile UE device 230 can, and sometimes does, communicate with WiFi AP 206 via WiFi air interface 234. Mobile UE device 230 can, and sometimes does, communicate with cell base station 210 via LTE-Uu air interface 236. The WiFi AP 206 can, and sometimes does, communicate with the cell base station 218 via NB-IoT interface 238.

Figure 3:
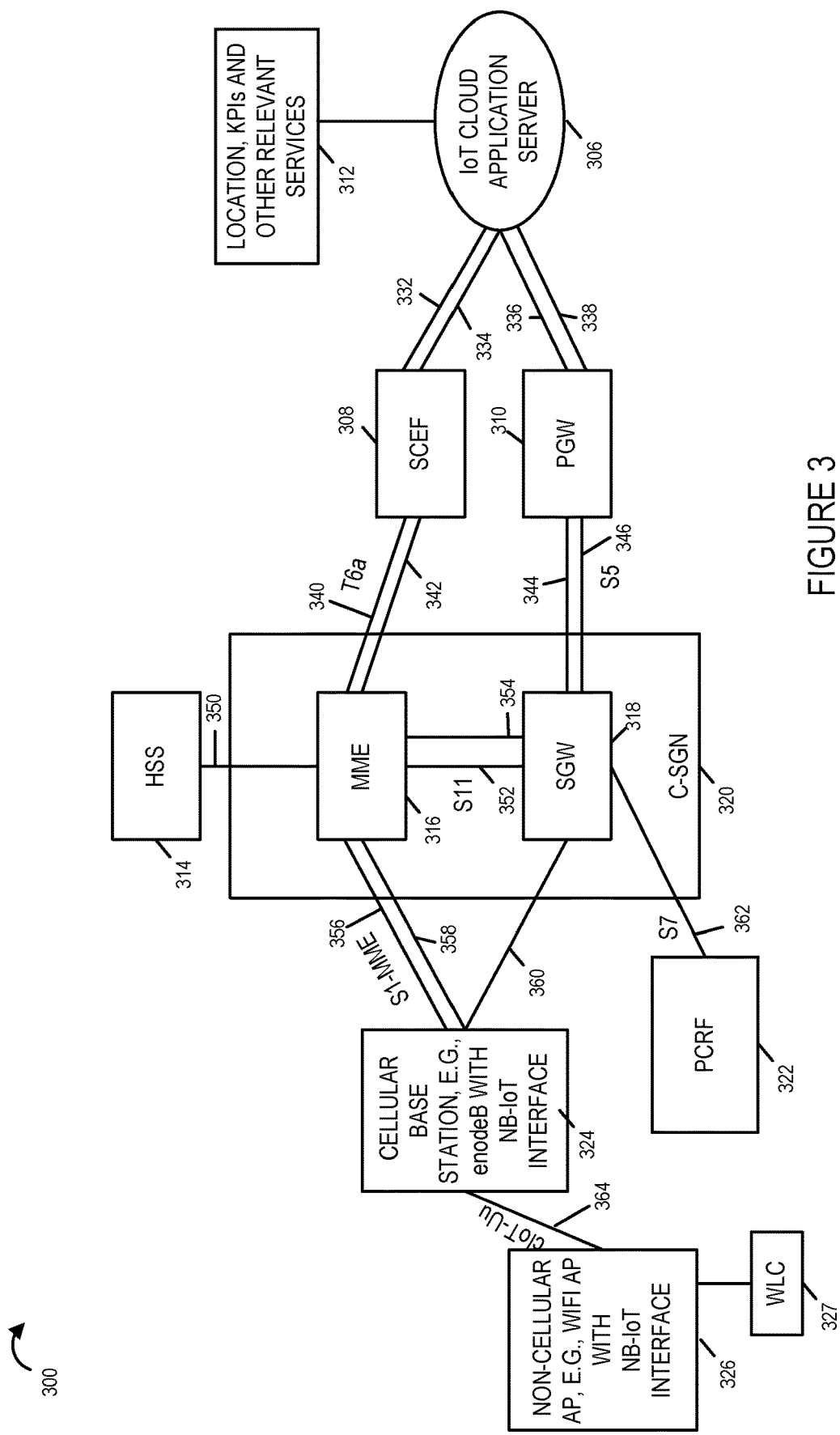
FIG. 3 is a drawing of exemplary system including NB-IoT architecture in accordance with an exemplary embodiment.

FIG. 3 is a drawing of exemplary system 300 including NB-IoT architecture in accordance with an exemplary embodiment. Exemplary system 300 includes architecture for providing a network management service in accordance with an exemplary embodiment. Exemplary system 300 includes an IoT cloud application server 306, a Service Capability Exposure Function (SCEF) 308, a Packet Gateway (PGW) 310, a Home Subscriber Server (HSS) 314, a Mobility Management Entity (MME) 316 and a Serving Gateway (SGW) 318. The MME 316 and SGW 318 are part of a Cellular IoT Serving Gateway Node (C-SGN) 320. Exemplary system 300 further includes a Policy and Charging Rules Function (PCRF) 322, a cellular base station, e.g. eNodeB, with a NB-IoT interface 224, a non-cellular access point (AP), e.g., a WiFi AP, with an NB-IoT interface 326, and a Wireless Local area network Controller (WLC) 327.

IoT cloud application server 306 provides location, load management services including obtaining Key Performance Indicators (KPIs) corresponding and network statistics and using those KPIs and network statistics to determine congestion and initiate a session, e.g., a non-cellular network session or a cellular network session, to alleviate congestion, and other relevant services. IoT cloud application server 306 is coupled to SCEF 308 via links 332, 334. IoT cloud application server 306 is coupled to PGW 310 via links 336, 338. SCEF 308 is coupled to MME 316 via T6a connections 340, 342. PGW 310 is coupled to SGW 318 via S5 connections 344, 346. MME 316 is coupled to SGW 318 via S11 connections 352, 354. HSS 214 is coupled to MME 316 via link 350.

MME 316 is coupled to cellular base station e.g., enodeB, with NB-IoT interface 324 via S1-MME connections 356, 358. The cellular base station, e.g., eNodeB, with NB-IoT interface 324 is also coupled to SGW 318 via link 360. PCRF 322 is coupled to SGW 318 via S7 connection 362.

The cellular base station, e.g. eNodeB, with NB-IoT interface 324 is coupled to the non-cellular access point, e.g., WiFi AP, with NB-IoT interface 326 via one or more cIoT-Uu interface connections 364.

HSS attached component 314 will keep information of non-cellular APs and may include or be coupled to a database will keep the information for clients with a subscription service. This storage of such information can be and sometimes is implemented for clients, i.e., clients of non-cellular access points or for non-cellular access points.

Functions running on PCRF 322 and HSS 314 control, e.g., determine, how to charge a non-cellular AP, which is provided one or more services. For example, smart city networks and private LTE networks could be, and in some embodiments are, charged a service fee for a network load management service. On the other hand, in some embodiments, if the non-cellular APs belong to the same service provider network as the service provider network offering the network load management service, those non-cellular APs could be, and sometimes are waived from the service fee, e.g., with the network load management service being included as part of a feature of a standard service package.

Figure 4:
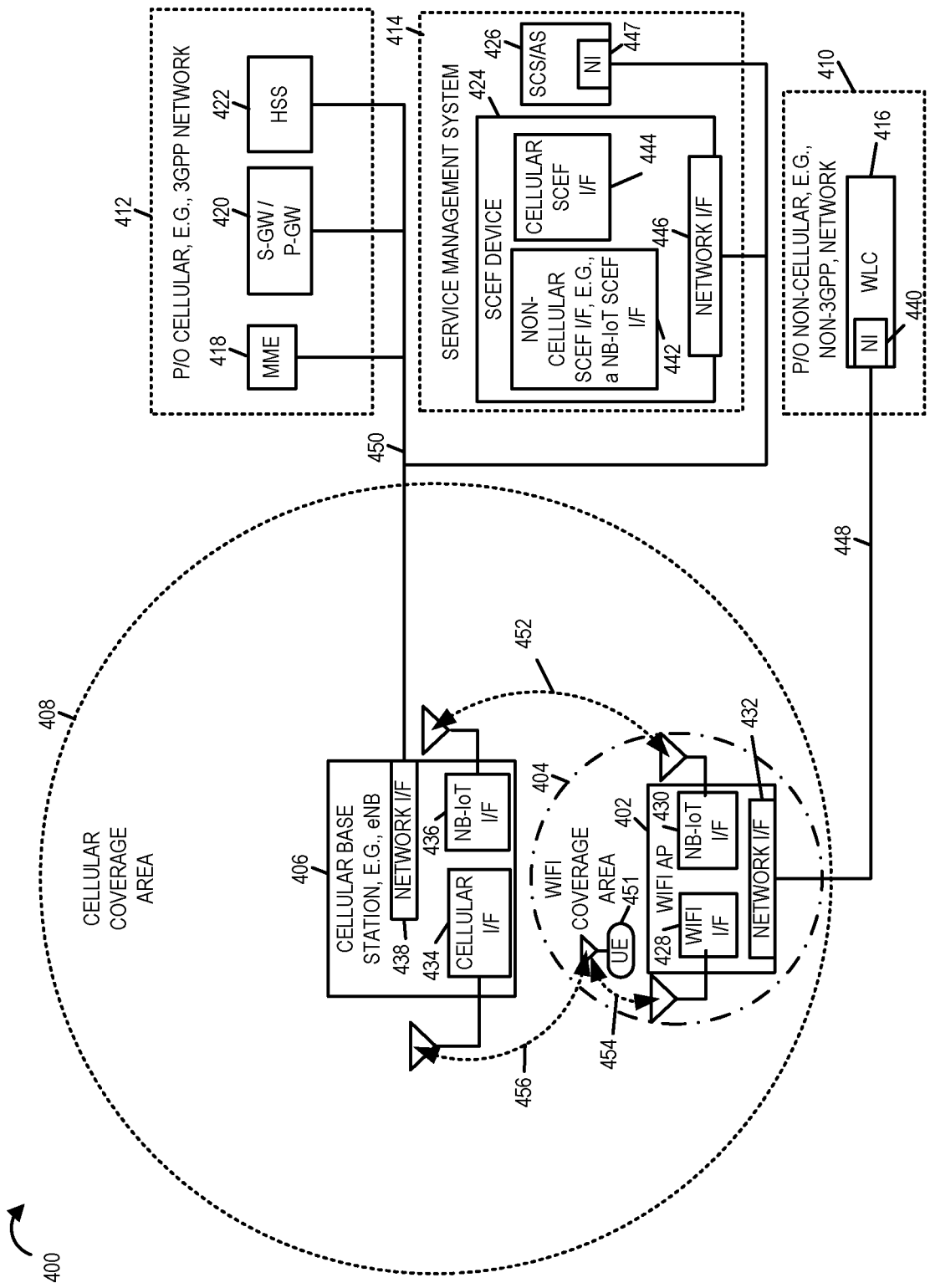
FIG. 4 is a drawing of an exemplary communications system in accordance with an exemplary embodiment.

FIG. 4 is a drawing of an exemplary communications system 400 in accordance with an exemplary embodiment. Communications system 400 includes a WiFi access point 402, with a corresponding WiFi coverage area 404, a cellular base station 406, e.g., an eNodeB, with a corresponding cellular coverage areas 408, and a portion of non-cellular, e.g. non-3GPP, network 410, a portion of cellular, e.g., 3GPP, network 412. The non-cellular network, e.g., a WiFi network, includes WiFi AP 402, and Wireless Local area network controller (WLC) 416. WLC 416 includes network interface (NI 440). The cellular network, includes cellular base station 406, Mobility Management Entity (MME) 418, S-GW/P-GW 420 and Home Subscriber Server (HSS) 422.

Communications system 400 further includes a service management system 414 including a Service Capability Exposure Function (SCEF) device 424 and a Service Capability Server/Application Server (SCS/AS) 426. The SCEF device 424 includes a non-Cellular SCEF interface (I/F), e.g., a NB-IoT SCEF interface (I/F) 442, a cellular SCEF interface (I/F) 444 and a network interface (I/F) 446. The SCS/AS 426 includes a network interface (NI) 447.

Cellular base station 406, e.g. an eNodeB, includes a cellular interface 434, a NB-IoT interface 436 and a network interface 438. WiFi AP 402 includes WiFi interface 428, NB-IoT interface 430 and network interface 432.

Cellular base station 408, MME 418, S-GW/P-GW 420, HSS 422, network interface 446 of SCEF device 446 and network interface 447 of SCS/AS 426 are coupled together via network link(s) 450. Network interface 432 of WiFi AP 402 is coupled to network interface 440 of WLC 416 via link(s) 448.

Exemplary communications system 400 further includes a plurality of user equipment (UE) devices including UE 451. UE device 451 supports cellular communications, e.g., LTE cellular communications, and non-cellular communications including WiFi communications. UE device 451 may, and sometimes does, communicate, via its cellular interface with cellular interface 434 of cellular base station 406, e.g., sending and receiving LTE signals over wireless cellular communications link 452. UE device 451 may, and sometimes does, communicate, via its WiFi interface with WiFi interface 428 of WiFi access 406, e.g., sending and receiving WiFi signals over WiFi communications link 456.

Cellular base station 406 may, and sometimes does, communicate with WiFi AP 402, via NB-IoT interfaces (436, 430), respectively. Thus NB-IoT signals are communicated over NB-IoT wireless communications link 452 between the cellular base station 406 and the WiFi AP 402. Exemplary NB-IoT signals communicate: requests for UE KPIs and network statistics, reports communicating UE KPIs and network statistics, initiate release messages, offload requests and offload responses.

In some embodiments, the same antenna(s) are used for both the cellular I/F 434 and NB-IoT interface 436 of cellular base station 406. In some embodiments, the same antenna(s) are used for both the WiFi I/F 428 and NB-IoT interface 430 of WiFi AP 402.

Figure 5A:
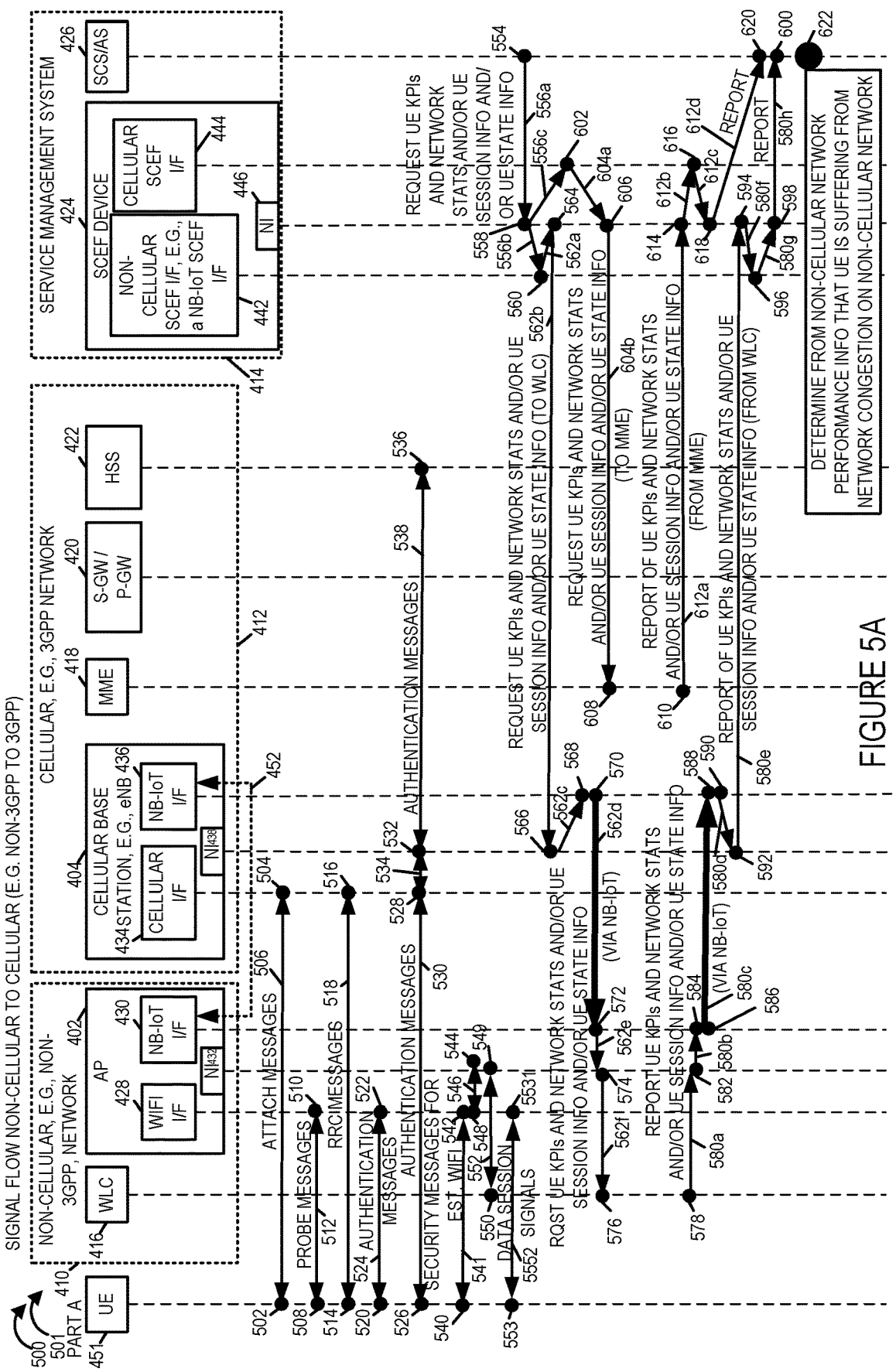
FIG. 5A is a first part of a drawing illustrating elements of exemplary system of FIG. 4 and exemplary steps and signaling flows for an example including detected congestion on a non-cellular network, e.g., a non-3GPP network, by a service provider management system and controlled transition of a communications session to a cellular network, e.g., a 3GPP network, in accordance with an exemplary embodiment, wherein some of the signaling related to network load management is communicated via a NB-IoT wireless communications link between a base station, e.g., an eNodeB, in the cellular network and an access point, e.g. a WiFi AP, in the non-cellular network.

FIG. 5, comprising the combination of FIG. 5A and FIG. 5, is a drawing 500, comprising Part A 501 and Part B 503, illustrating elements of exemplary system 400 of FIG. 4 and exemplary steps and signaling flows for an example including detected congestion on a non-cellular network, e.g., a non-3GPP network, by a service provider management system and controlled transition to a cellular network, e.g., a 3GPP network, in accordance with an exemplary embodiment, wherein some of the signaling related to network load management is communicated via a NB-IoT wireless communications link between a base station, e.g., an eNodeB, in the cellular network and an access point, e.g. a WiFi AP, in the non-cellular network.

In step 502 and 504, UE 451 and cellular base station 404, via its cellular interface 434, communicate attach messages 506. In step 508 and 510, UE 451 and WiFi AP 402, via its WiFi interface 428, communicate probe messages 512. In step 514 and 516, UE 451 and cellular base station 404, via its cellular interface 434, communicate Radio Resource Control (RRC) messages 518. In step 520 and 522, UE 451 and WiFi AP 402, via its WiFi interface 428, communicate authentication messages 512. In step 526 and 528, UE 451 and cellular base station 404, via its cellular interface 434, communicate authentication messages 530. In step 528 and 532, the cellular interface 434 and the network interface 438 of cellular base station 404 communicate authentication messages 534. In step 532 and step 536, the network interface 438 of the cellular base station 404 and the HSS 422 communicate authentication messages 538. In step 540 and step 542 the UE 451 and the WiFi AP 402, via its WiFi interface 428, communicate security messages for WiFi establishment 541. In steps 548 and steps 544 the WiFi interface 428 and the network interface 432 of WiFi AP 402 communicate security messages for WiFi establishment 546. In steps 549 and steps 550 the network interface 432 of WiFi AP 402 and the WLC 416 communicate security messages for WiFi establishment 552. In steps 553 and 5531 the UE 451 and the AP 402, via its WiFi interface 428, communicated data session signals 5552.

In step 554 the SCS/AS 426 of the service management system 414 generates and sends a request for UE KPIs and network statistics and/or UE session information and/or UE state information, via signal 556a, to network interface 446 of SCEF device 424. In step 558 the SCEF device 424 receives the request in signal 556a via its network interface 446, communicates the request via signal 556b to its non-cellular SCEF interface 442, and communicates the request in signal 556a to its cellular SCEF interface 444 via signal 556c. In step 602 the cellular SCEF interface 444 receives signal 556c including the request, which originated from the SCS/AS.

Returning to step 560, in step 560 the non-cellular SCEF interface 442 receives the request in signal 556b, and generates a request for UE KPIs and network statistics and/or session information and/or UE state information in signal directed to WLC 416, and sends the request to network interface 446 for output. In step 564 network interface 446 of the SCEF device outputs the request in signal 562b. In step 566 the network interface 438 of cellular base station 404 receives signal 562b communicating the request for UE KPIs and network statistics and/or session information and/or UE state information, and sends the request, via signal 562c to the NB-IoT interface 436 of the cellular base station 404. In step 568, the NB-IoT interface 436 of the cellular base station 404 receives the request in signal 562c. In step 570 the NB-IoT interface 436 generates and transmits NB-IoT signal 562d including the request for UE KPIs and network statistics and/or session information and/or UE state information. In step 572, the NB-IoT interface 430 of the WiFi AP 402 receives the request in NB-IoT signal 562d, recovers the communicated information including the request. The recovered request is included in signal 562e which is received in step 574 for output by the network interface 432 of the WiFi AP 402. In step 574 the request for UE KPIs and network statistics and/or session information and/or UE state information is sent in signal 562f from the network interface 432 of WiFi AP 404 to the WLC 416, and in step 576 the request is received by WLC 416 and processed. In step 578, the WLC 416, in response to the request received in signal 562f, generates and sends signal 580a including a report including UE KPIs and network statistics and/or UE session information and/or UE state information. The network interface 432 of the WiFi AP 404 receives signal 580a. The report is recovered by WiFi AP 402 and sent to NB-IoT interface 430 via signal 580b. In step 584 the NB-IoT interface 430 receives signal 580b including the report. In step 586 the NB-IoT interface 430 generates an NB-IoT signal 580c including the report including UE KPIs and network statistics and/or UE session information and/or UE state information, said report being sourced from the WLC 416, and transmits signal 580c over NB-IoT wireless link 452 to NB-IoT interface 436 of cellular base station 404. In step 588 the cellular base station 404 receives NB-IoT signals 580c including the report from the WLC. In step 590 signal 580d including the report is communicated to the network interface 438 of the cellular base station 404. In step 592 signal 580e is output from the network interface 438 of cellular base station 404 and send to the SCEF device 424. In step 594 the network interface 446 of the SCEF device 424 receives signal 580e including the report from the WLC. In step 594 the report is communicated from the network interface 594 to the non-cellular SCEF interface 442, via signal 580f In step 596, the non-cellular interface 442 receives signal 580f including the report from the WLC, generates signal 580g including the report and sends signal 580g to the network interface 446 of SCEF device 424. In step 598 signal 580f including the report from the WLC is output and sent to the SCS/AS 426 and is received in step 600.

Returning to step 602, in step 602 the cellular SCEF interface generates and sends signal 604a including a request for UE KPIs and network statistics and/or UE session information and/or UE state information, said request being directed to the MME 418. In step 606 signal 604a is received by network interface 446 and output as signal 604b. In step 608 MME 418 receives signal 604b including the request for UE KPIs and network statistics and/or UE session information and/or UE state information. In step 610, the MME 418, in response to the request of signal 604b, the MME 418 generates and sends signal 612a including a report of UE KPIs and network statistics and/or UE session information and/or UE state information. In step 614 the network interface 446 of the SCEF device 446 receives signal 612a including the report from the MME, and forwards the report via signals 612b, to the cellular SCEF interface 444. In step 616 the cellular SCEF interface 44 receives signal 612b and generates and sends signal 612c including the report from the MME to network interface 446. In step 618 the network interface 446 receives signal 612c and output signals 612d which includes the report from the MME. In step 620 the SCS/AS 426 receives signal 612d and recovers the report from the MME.

In step 622 the SCS/AS determines from the non-cellular network performance information, e.g., included in the received report from the WLC 416 of signal 580h, that the UE 451 is suffering from network congestion on the non-cellular network.

In step 624, the SCS/AS 426 of the service management system 414 generates and sends an initiate cellular, e.g., 3GPP, session signal 626 for congestion control directed to MME 628. In step 628, the MME receives signal 628 and starts performing operation to initiate a cellular session for UE 451, in response to signal 626.

In step 630 the cellular SCEF interface 44 of the SCEF device 444 generates and sends offload request signal 632 to the network interface 446 to be sent to the MME 418. In step 634 the network interface receives offload request signal 632 and outputs, e.g., sends, offload request signal 636 to MME 628. In step 638 the MME 418 receives the offload request signal 636. IN step 640, the MME 418, in response to the received offload request, generates and sends an offload response signal 642 to the SCEF device 424. In step 644 the SCEF device 424 receives the offload response 642, via network interface 446 and send the offload response as signal 646 to the cellular SCEF interface 444. In step 648, the cellular SCEF interface 444 receives signal 646 communicating the offload request. In step 650 and step 652 the MME 418 and cellular base station, via its network interface 438, communicate association messages. In steps 652 and 656 association messages 658 are communicated between the network interface 438 and the cellular interface 656 of base station 404. In steps 660 and 662 the MME 418 and S-GW/PGW 420 communicate session creation signals.

In step 666 the non-cellular SCEF interface 442 of the SCEF device 424 generates and sends signal 668a communicating an initiate release directed to the WLC 416. Signal 668a is received by network interface 446 of SCEF device 424, and is output from network interface 446, as signal 668b communicating the initiate release. In step 674, the network interface 438 of the cellular base station 404 receives signal 668b, and forwards the initiate release to the NB-IoT interface as signal 668c. In step 676 the NB-IoT interface generates and transmits NB-IoT signal 668d (which includes the initiate release, over the NB-IoT communications link 452, thus communicating the initiate release to the WiFi AP 402. In step 678 the WiFi AP receives signal 668d, via its NB-IoT interface 430, and recovers the initiate release. In step 680 the NB-IoT interface 430 communicates the initiate release via signal 688e to the network interface 432 of WiFi AP 402. In step 682 signal 688f is output from the network interface 430 of the AP 402 and sent to the WLC 416. In step 684 the WLC 416 receives signal 688f and recovers the initiate release.

In step 686 and step 687 the S-GW/P-GW 420 and the cellular base station 404, via its network interface 438 communicated LTE radio access bearer signals. In steps 689 and step 690, the cellular base station 404, via its cellular interface 434 and the UE 451 communicate radio data link signals 691, e.g., corresponding to the newly created session.

In step 692 the WLC 416 generates and sends signal 693a communicating a congestion relief command to the network interface 432 of the WiFi access point 402. In step 694 the network interface 432 of WiFi AP 402 receives signal 693a communicating the congestion relief command, and forwards the command in signal 693b to the WiFi interface 428 of AP 402. In response to the received congestion relief command, in step 696 the WiFi AP 404 transmits signal 698 including a disassociation message, via its WiFi interface 428 to UE 451. In step 699 UE 451 receives signal 698 communicating the disassociation message. In steps 6991 and steps 6992 the UE 451 and AP 402, via its WiFi interface 428, communicated signals 6993 communicating disassociation complete. In step 6994 the UE 451 is identified as having disassociated from non-cellular, e.g. non-3GPP, network. Thus in the example of FIG. 5, the UE 451 has moved its communications session from the non-cellular network to the cellular network.

Figure 6A:
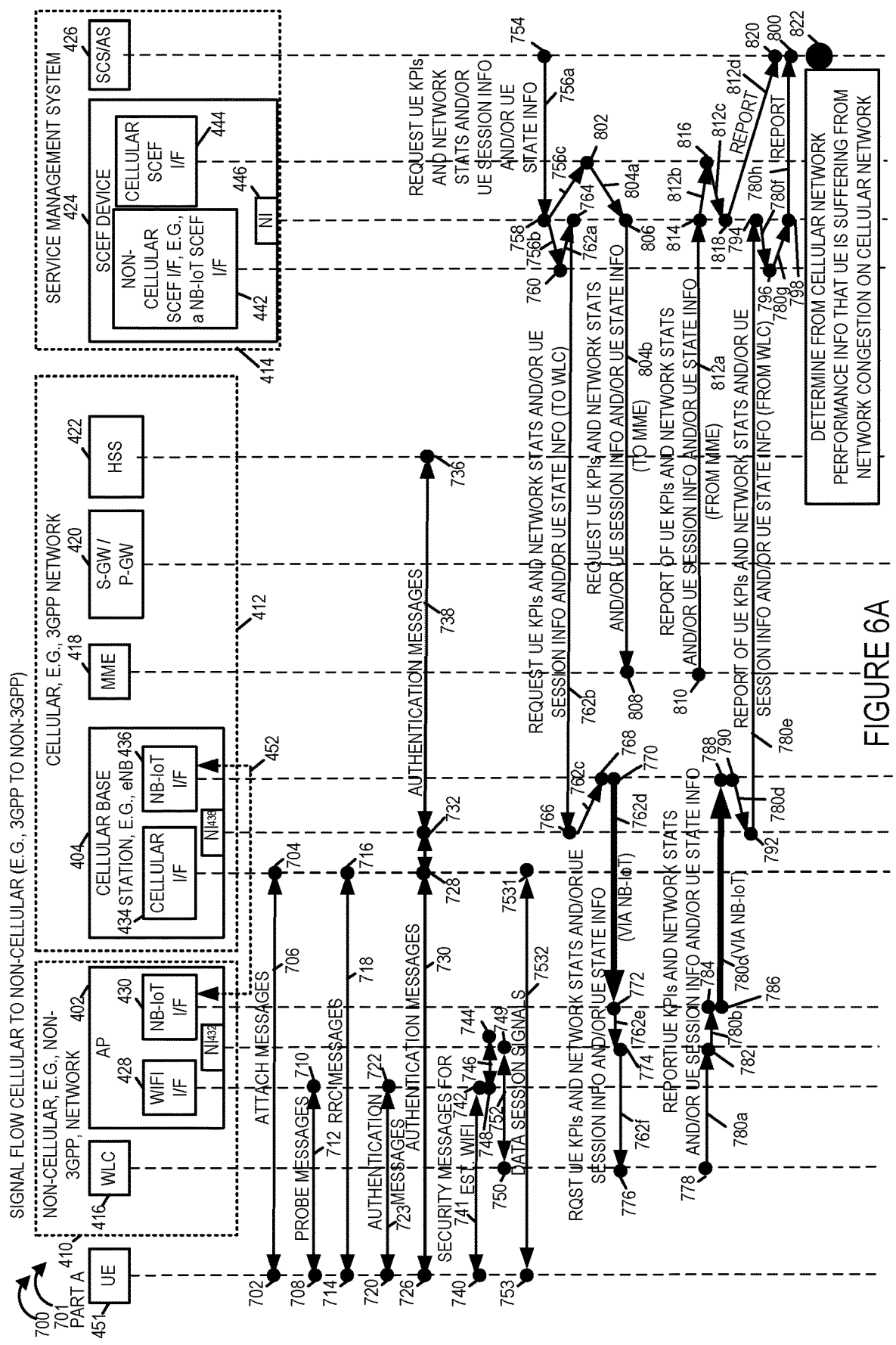
FIG. 6A is a first part of a drawing 700 illustrating elements of exemplary system of FIG. 4 and exemplary steps and signaling flows for an example including detected congestion on a cellular network, e.g., a 3GPP network, by a service provider management system and controlled transition of a communications session to a non-cellular network, e.g., a 3GPP network, in accordance with an exemplary embodiment, wherein some of the signaling related to network load management is communicated via a NB-IoT wireless communications link between a base station, e.g., an eNodeB, in the cellular network and an access point, e.g. a WiFi AP, in the non-cellular network.

FIG. 6, comprising the combination of FIG. 6A and FIG. 6B, is a drawing 700, comprising Part A 701 and Part B 703, illustrating elements of exemplary system 400 of FIG. 4 and exemplary steps and signaling flows for an example including detected congestion on a cellular network, e.g., a 3GPP network, by a service provider management system and controlled transition to a non-cellular network, e.g., a 3GPP network, in accordance with an exemplary embodiment, wherein some of the signaling related to network load management is communicated via a NB-IoT wireless communications link between a base station, e.g., an eNodeB, in the cellular network and an access point, e.g. a WiFi AP, in the non-cellular network. In step 702 and 704, UE 451 and cellular base station 404, via its cellular interface 434, communicate attach messages 706. In step 708 and 710, UE 451 and WiFi AP 402, via its WiFi interface 428, communicate probe messages 712. In step 714 and 716, UE 451 and cellular base station 404, via its cellular interface 434, communicate Radio Resource Control (RRC) messages 718. In step 720 and 722, UE 451 and WiFi AP 402, via its WiFi interface 428, communicate authentication messages 712. In step 726 and 728, UE 451 and cellular base station 404, via its cellular interface 434, communicate authentication messages 730. In step 728 and 732, the cellular interface 434 and the network interface 438 of cellular base station 404 communicate authentication messages 734. In step 732 and step 736, the network interface 438 of the cellular base station 404 and the HSS 422 communicate authentication messages 738. In step 740 and step 742 the UE 451 and the WiFi AP 402, via its WiFi interface 428, communicate security messages for WiFi establishment 741. In steps 748 and steps 744 the WiFi interface 428 and the network interface 432 of WiFi AP 402 communicate security messages for WiFi establishment 746. In steps 749 and steps 750 the network interface 432 of WiFi AP 402 and the WLC 416 communicate security messages for WiFi establishment 752. In steps 753 and 7531 the UE 451 and cellular base station 404, via its cellular interface 434, communicate data session signals 7532.

In step 754 the SCS/AS 426 of the service management system 414 generates and sends a request for UE KPIs and network statistics and/or UE session information and/or UE state information, via signal 756a, to network interface 446 of SCEF device 424. In step 758 the SCEF device 424 receives the request in signal 756a via its network interface 446, communicates the request via signal 756b to its non-cellular SCEF interface 442, and communicates the request in signal 756a to its cellular SCEF interface 444 via signal 756c. In step 802 the cellular SCEF interface 444 receives signal 756c including the request, which originated from the SCS/AS.

Returning to step 760, in step 760 the non-cellular SCEF interface 442 receives the request in signal 756b, and generates a signal 762a including the request for UE KPIs and network statistics and/or session information and/or UE state information directed to WLC 416, and sends the request to network interface 446 for output. In step 764 network interface 446 of the SCEF device 424 outputs the request in signal 762b. In step 766 the network interface 438 of cellular base station 404 receives signal 762b communicating the request for UE KPIs and network statistics and/or session information and/or UE state information, and sends the request, via signal 762c to the NB-IoT interface 436 of the cellular base station 404. In step 768, the NB-IoT interface 436 of the cellular base station 404 receives the request in signal 762c. In step 770 the NB-IoT interface 436 generates and transmits NB-IoT signal 762d including the request for UE KPIs and network statistics and/or session information and/or UE state information, said NB-IoT signal 762b being communicated over NB-IoT wireless link 452. In step 772, the NB-IoT interface 430 of the WiFi AP 402 receives the request in NB-IoT signal 762d, recovers the communicated information including the request. The recovered request is included in signal 762e which is received in step 774 for output by the network interface 432 of the WiFi AP 402. In step 774 the request for UE KPIs and network statistics and/or session information and/or UE state information is sent in signal 762f from the network interface 432 of WiFi AP 404 to the WLC 416, and in step 776 the request is received by WLC 416 and processed. In step 778, the WLC 416, in response to the request received in signal 762f, generates and sends signal 780a including a report including UE KPIs and network statistics and/or UE session information and/or UE state information. The network interface 432 of the WiFi AP 404 receives signal 780a. The report is recovered by WiFi AP 402 and sent to NB-IoT interface 430 via signal 780b. In step 784 the NB-IoT interface 430 receives signal 780b including the report. In step 786 the NB-IoT interface 430 generates an NB-IoT signal 780c including the report including UE KPIs and network statistics and/or UE session information and/or UE state information, said report being sourced from the WLC 416, and transmits signal 780c over NB-IoT wireless link 452 to NB-IoT interface 436 of cellular base station 404. In step 788 the cellular base station 404 receives NB-IoT signals 780c including the report from the WLC. In step 790 signal 780d including the report is communicated to the network interface 438 of the cellular base station 404. In step 792 signal 780e is output from the network interface 438 of cellular base station 404 and sent to the SCEF device 424. In step 794 the network interface 446 of the SCEF device 424 receives signal 780e including the report from the WLC. In step 794 the report is communicated from the network interface 594 to the non-cellular SCEF interface 442, via signal 780f In step 796, the non-cellular interface 442 receives signal 780f including the report from the WLC, generates signal 780g including the report and sends signal 780g to the network interface 446 of SCEF device 424. In step 798 signal 780f including the report from the WLC is output and sent to the SCS/AS 426 and is received in step 800.

Returning to step 702, in step 702 the cellular SCEF interface 444 generates and sends signal 804a including a request for UE KPIs and network statistics and/or UE session information and/or UE state information, said request being directed to the MME 418. In step 806 signal 804a is received by network interface 446 and output as signal 804b. In step 808 MME 418 receives signal 804b including the request for UE KPIs and network statistics and/or UE session information and/or UE state information. In step 810, the MME 418, in response to the request of signal 804b, the MME 418 generates and sends signal 812a including a report of UE KPIs and network statistics and/or UE session information and/or UE state information. In step 814 the network interface 446 of the SCEF device 446 receives signal 812a including the report from the MME, and forwards the report via signals 812b, to the cellular SCEF interface 444. In step 816 the cellular SCEF interface 444 receives signal 812b and generates and sends signal 812c including the report from the MME to network interface 446. In step 818 the network interface 446 receives signal 812c and output signals 812d which includes the report from the MME. In step 820 the SCS/AS 426 receives signal 812d and recovers the report from the MIME.

In step 822 the SCS/AS 426 determines from cellular network performance information, e.g., included in the received report from the MME 418 of signal 812d, that the UE 451 is suffering from network congestion on the cellular network.

In step 824, the SCS/AS 426 of the service management system 414 generates and sends an initiate non-cellular, e.g., non-3GPP, session signal 826 for congestion control directed to MME 628. In step 828, the MME receives signal 828 and starts performing operation to initiate non-cellular session for UE 451, in response to signal 826.

In step 830 the non-cellular SCEF interface 442 of the SCEF device 424 generates and sends an offload request 832. The offload request is communicated as various signals which are designated using letters following the number 832 with the letter corresponding to a particular link over which the offload request 832 is communicated. The SCEF device 424 sends the offload request in signal 832a to the network interface 446 to be sent to the WLC 416. In step 834 the network interface 446 receives offload request signal 832a and outputs, e.g., sends, offload request as signal 832b to the network interface 438 of cellular base station 404. In step 836 the network interface 438 of cellular base station 404 receives signal 832 communicating the offload request and communicates the offload request in signal 832c to the NB-IoT interface 432 of the cellular base station. In step 838 the NB-IoT interface 436 of the cellular base station 404 generates and transmits signal 832d including the offload request. Signal 832d traverses the NB-IoT link between the cellular base station 404 and AP 402. Thus the offload request 832 is communicated via a NB-IoT link. In step 840 the NB-IoT interface of the WiFi AP 402 receives signal 832d communicating the offload request, and sends the offload request to network interface 432 via signal 832e. In step 842, the WiFi AP sends, e.g., outputs via its network interface 432, signal 832f including the offload request used to signal to the non-cellular network that the cellular network is seeking to handoff the UE device 451 and have sessions that the UE 451 has ongoing transferred, e.g., handed off, to the non-cellular network. The offload request may and sometimes does include information about the resources, e.g., amount of bandwidth and/or other information, required by the UE 451 to be successful and/or other information such as UE 451 device capability information. In step 844 the WLC 416 receives signal 832f and recovers the communicated offload request. In step 846, the WLC 416, in response to the received offload request, generates and sends an offload response message 848. The offload response message is communicated in various signals including signal 848a which is sent from the WLC. The offload response message 848 to the service management system via the NB-IoT communications link that exists between the AP 402 and cellular base station 404. Letters after the number 848 are used to indicate signals which communicate the message 848 which the letter corresponding to a different link in the path between the WLC 416 and service management system 414.

The offload response indicates in some embodiments that the handoff of the UE 451 is being accepted by the non-cellular network. This is normally the case when the WLC 416 determines that it has sufficient resources available to support the needs, e.g., sessions and/or data requirements, of the UE 451. In step 850, the AP 402 receives signal 848a via its network interface 432 and forwards the offload response to the NB-IoT interface 430 via signal 848b. In step 852 the NB-IoT interface 430 of the AP 402 receives signal 848b, recovers the communicated offload request, and generates and transmits, via NB-IoT interface 430, NB-IoT signals 848c including the offload response. In step 440 the NB-IoT interface 436 of the cellular base station receives NB-IoT signals 848c communicating the offload response, recovers the offload response, and sends signals 848d including the offload response to the network interface 438 of the cellular base station 404. In step 856, the cellular base station sends, e.g. outputs via its network interface 438, signal 848e including the offload response. In step 858, the SCEF device 424 receives, via its network interface 446, signal 848e including the offload response, and sends signal 848f including the offload response to the non-cellular SCEF interface 442. In step 860 the non-cellular SCEF interface 442 of SCEF device 442 receives signal 848f and recovers the offload response, which originated from the WLC 416, and which is in response to the non-cellular SCEF interface 442 generated offload request of signal 832a.

The signal flow shown in FIG. 6B assumes that the offload response includes an indication that the non-cellular network is capable and/or willing to accept handoff of the UE 451 to the non-cellular network. In cases where the offload response indicates the non-cellular network is not willing to accept the handoff the service management system does not proceed with the handoff to the non-cellular network and the sessions corresponding to the UE will continue to be serviced by the cellular network.

However, in the FIG. 6B example, since the non-cellular network can take over one, more or all of the session or sessions being handled by the cellular network for the UE 451 and the WLC 416 has indicated this ability and/or willingness to accept the handover in the offload response message 848, in step 862, the WLC 416 generates and sends signal 864 including a takeover command to AP 402, which is received in step 866 by the AP 402, via its WiFi interface. The takeover command indicates the UE which the AP 402 is to serve and take over the ongoing communications sessions and, in some cases, provides session state and/or other information used by the AP to assume responsibility for the ongoing sessions in which UE 451 is a participant. In response to the takeover command the AP 402 becomes the UE's point of network attachment and assumes responsibility for the session or sessions, e.g., voice or data sessions, that the UE 451 was previously conducting through the cellular network.

In steps 868 and 870 the UE 451 and the AP 402, via its WiFi interface 428, communicate data session signals 872 with the session or sessions previously being conducted for the UE 451 through the cellular base station 404, e.g., with another UE or other device which is the other end point of the session or sessions, now being conducted through the AP 402 rather than the base station 404.

In step 874 the MME 418 generates and sends release command 876 to cellular base station 404, and in step 878 the cellular base station 404 receives, via its network interface 438, the release command 876. In step 890, the cellular base station 404, in response to the received release command, generates and sends, via its cellular interface 434, RRC release message 892 to UE 451. In step 894 UE 451 receives the release command. The UE 451 releases the radio resources it was using to communicate with the base station in response to the received release message. In step 895 the UE 451 sends, and in step 897 the cellular base station 404 receives, via its cellular interface 434, the communicated RRC release complete signal 896. Then in step 898 the cellular base station 404 transitions the UE 451 into an idle state with respect to the cellular network. At this point the radio resources which the UE 451 was using for supporting one or more communications sessions via the cellular base station 404 have been released reducing congestion in the cellular network.

In step 898 the UE 451 is identified as being in LTE idle mode. Thus in the example of FIG. 6, the UE 451 has moved its communications session from the cellular network to the non-cellular network by the time of step 899.

Figure 7A:
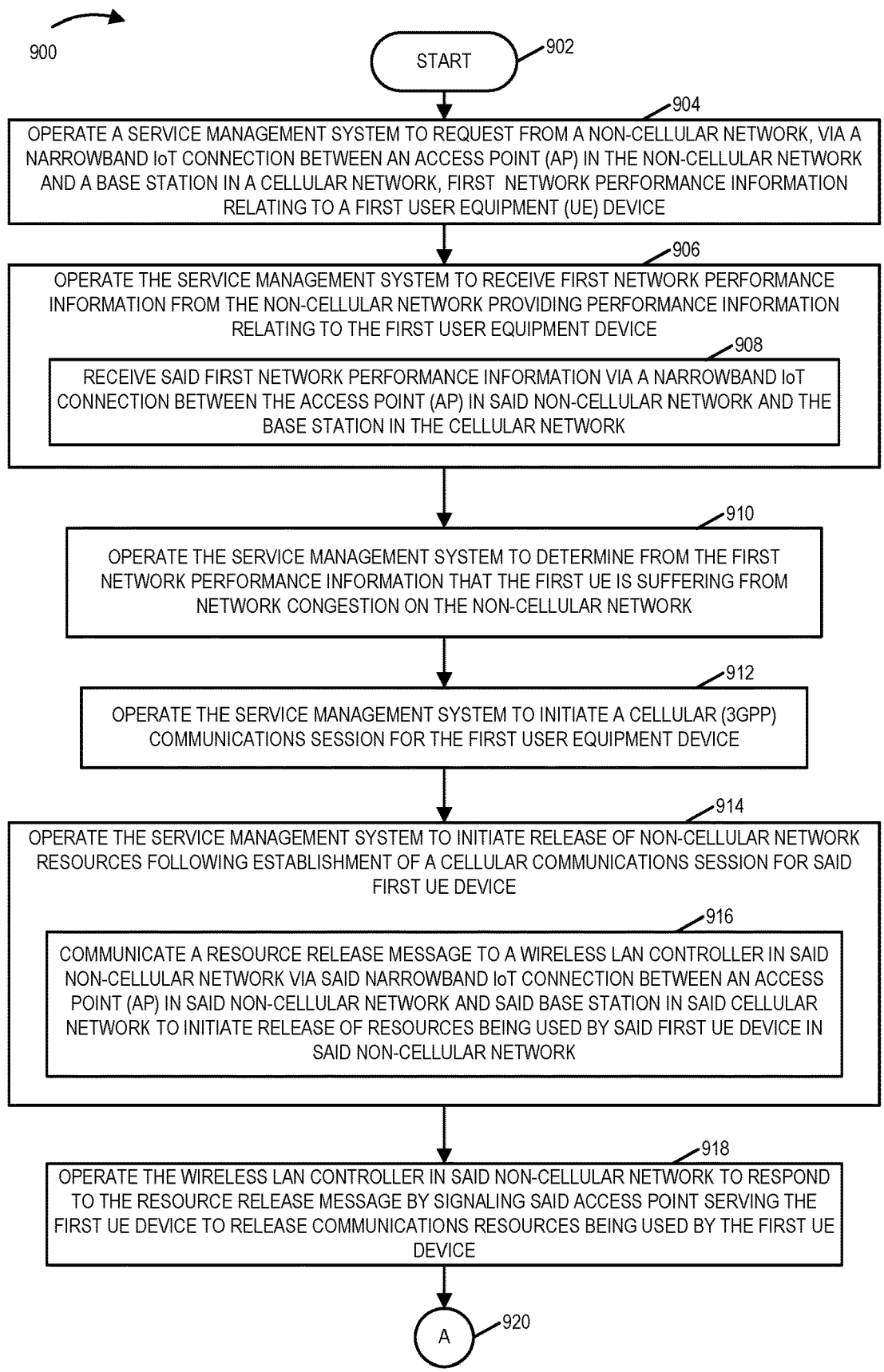
FIG. 7A is a first part of a flowchart of an exemplary communications method in accordance with an exemplary embodiment.

FIG. 7, comprising the combination of FIG. 7A and FIG. 7B, is a flowchart 900, comprising the combination of Part A 901 and Part B 903, of an exemplary communications method in accordance with an exemplary embodiment. Operation starts in step 902 in which the communications system including a cellular network, e.g., a 3GPP cellular network, and a non-cellular network, e.g., a non-3GPP network such as, e.g. a WiFi network, is powered on and initialized. Operation proceeds from start step 902 to step 904.

In step 904 a service management system requests from a non-cellular network, via a narrowband IoT connection between an access point, e.g., WiFi AP, in the non-cellular network and a base station in a cellular network, first network performance information relating to a first user equipment (UE) device. Operation proceeds from step 904 to step 906.

In step 906 the service management system receives first network performance information, e.g. key performance indicators (KPIs) and/or non-cellular network statistics, from the non-cellular network providing performance information relating to the first UE device. Step 906 includes step 908 in which the first network performance information is received via a narrowband IoT connection between the access point (AP) in the non-cellular network and the base station in the cellular network. Operation proceeds from step 906 to step 910.

In step 910 the service management system determines from the first network performance information that the first UE is suffering from network congestion on the non-cellular network. Operation proceeds from step 910 to step 912.

In step 912 the service management system initiates a cellular, e.g., 3GPP, communications session for the first UE device. Operation proceeds from step 912 to step 914.

In step 914 the service management system initiates release of non-cellular network resources following establishment of a cellular communications session for the first UE device. Step 914 includes step 916 in which a resource release message is communicated to a wireless LAN controller (WLC) via said narrowband IoT connection between the access point in the non-cellular network and the base station in said cellular network to initiate release of resources being used by the first UE device in said non-cellular network. Operation proceeds from step 914 to step 918.

In step 918 the wireless LAN controller in said non-cellular network responds to the resource release message by signaling, e.g., sending a congestion relief command to, said access point serving the first UE device to release communications resources being used by the first UE device. Operation proceeds from step 918, via connecting node A 920, to step 922.

In step 922 the service management system determines from cellular network performance information that the first UE is suffering from network congestion in the cellular network. Operation proceeds from step 922 to step 924.

In step 924 the service management system sends an initiate non-cellular session message to a mobility management entity to cause the mobility management entity to initiate a non-cellular session for the first UE device to allow the non-cellular network to take over a communications session corresponding to the first UE from the cellular network. Operation proceeds from step 924 to step 926.

In step 926 the service management system sends an offload request via the cellular base station to the wireless LAN controller (WLC) in the non-cellular network. Step 926 includes step 928 in which the offload request is communicated to the WLC controller via the NB-IoT communications link between the cellular base station in the cellular network and the access point in the non-cellular network. Operation proceeds from strep 926 to step 930.

In step 930 the WLC sends an offload response, e.g., indicating the non-cellular network will accept handover of the first UE, to the service management system via the NB-IoT communications link. Operation proceeds from step 930 to step 932.

In step 932 the WLC sends a takeover command to the non-cellular access point signaling the non-cellular access point that it is to take over one or more communications sessions corresponding to the first UE that were previously being supported by the cellular base station. Operation proceeds from step 932 to step 934.

In step 934 the access point participates in a data session which was handed off from the cellular network. Operation proceeds from step 934 to step 936.

In step 936 the mobility management entity sends a resource release command to the cellular base station to release resources that were being used to support the communications session corresponding to the first UE being handed over to the non-cellular network. Operation proceeds from step 936 to step 938.

In step 938 the cellular base station sends a radio resource control (RRC) release message to the first UE to release cellular network radio resources being used by the first UE to support the communications session corresponding to the first UE handed over to the non-cellular network. Operation proceeds from step 938 to step 940.

In step 940 the cellular base station receives a radio resource control (RRC) release complete message from the first UE signaling that the first UE has released cellular radio resources that it was using. Operation proceeds from step 940 to step 942.

In step 942 the cellular base station transitions the first UE into an idle state with respect to the cellular network.

Figure 8:
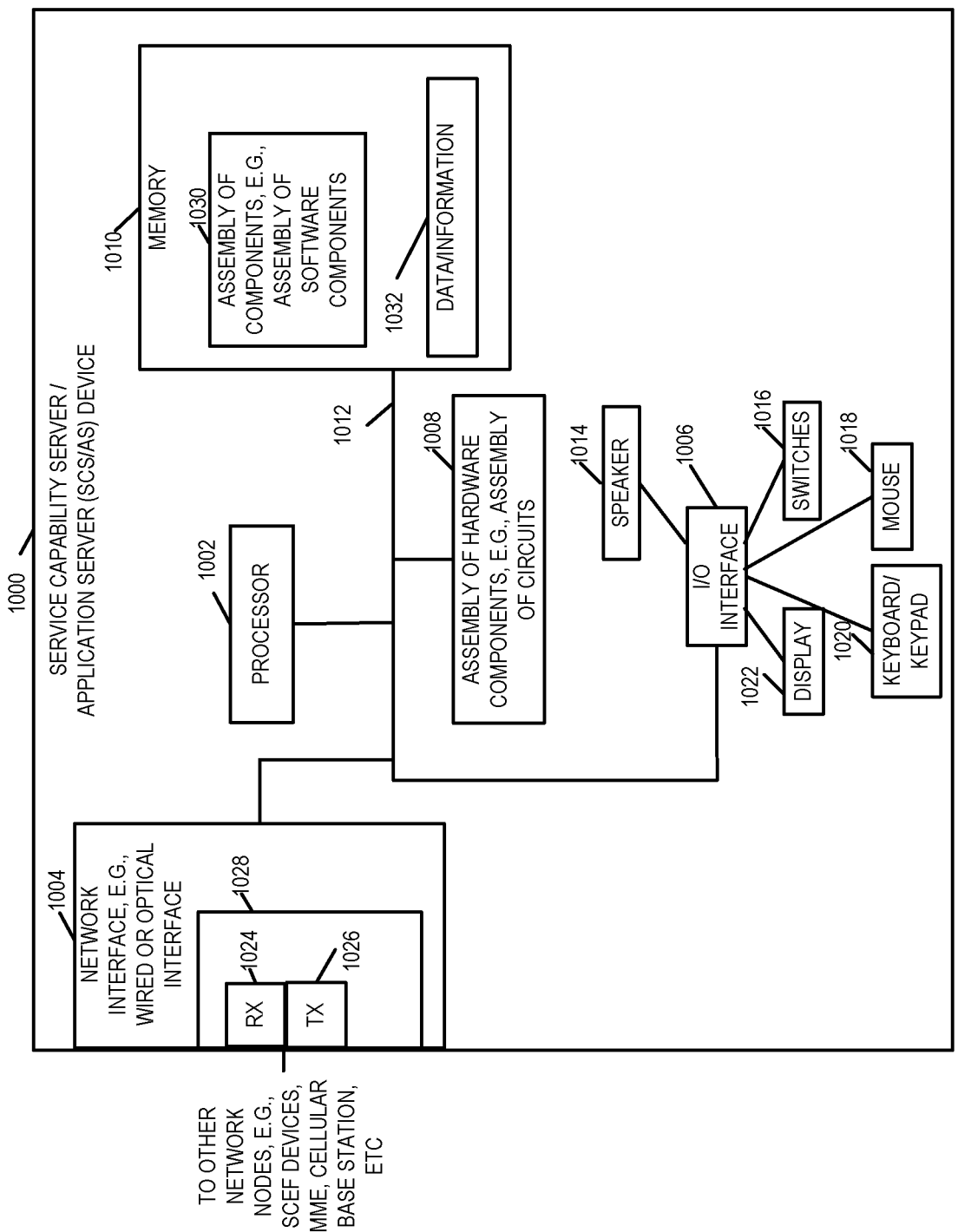
FIG. 8 is a drawing of an exemplary service capability server/application server (SCS/AS) in accordance with an exemplary embodiment.

FIG. 8 is a drawing of an exemplary service capability server/application server (SCS/AS) device 1000 in accordance with an exemplary embodiment. Exemplary SCS/AS device 1000 of FIG. 8 is, e.g., any of SCS/AS 426 of FIGS. 4, 5, and 6, or IoT cloud application server 306 of FIG. 3. Exemplary SCS/AS device 1000 includes a processor 1002, e.g., a CPU, a network interface 1004, e.g., a wired or optical interface, an I/O interface 1006, an assembly of hardware component 1008, e.g., an assembly of circuits, and memory 1010 coupled together via bus 1012 over which the various elements (1002, 1004, 1006, 1008, 1010) may interchange data and information. SCS/AS device 1000 further includes a speaker 1014, switches 1016, a mouse 1018, keyboard/keypad 1020, and display 1022, coupled to I/O interface 1006, via which the various I/O devices (1014, 1016, 1018, 1020, 1022) may interchange data and information with elements (1002, 1004, 1008, 1010). Network interface 1004 includes a receiver 1024, via which the SCS/AS device 1000 may receive signals, e.g., including messages, from other network nodes and a transmitter 1026 via which the SCS/AS device 1000 may send signals, e.g., including messages, to other network nodes. In some embodiments, the receiver 1024 and transmitter 1026 are included as part of a transceiver 1028. Exemplary network nodes include a service capability exposure function (SCEF) device, a mobility management entity (MME), and a cellular base station. Memory 1010 includes assembly of components 1030, e.g., an assembly of software components, and data/information 1032.

In some embodiments, SCS/AS device 1000 is alternatively implemented, e.g., in a service management system, as two distinct devices, e.g., a SCS device and an AS device, which are coupled together within the service management system. In some such embodiments, the SCS device and AS device each include a network interface including a receiver and a transmitter, a processor, an I/O interface, I/O devices, an assembly of hardware components, and a memory including a assembly of components and data/information.

Figure 9:
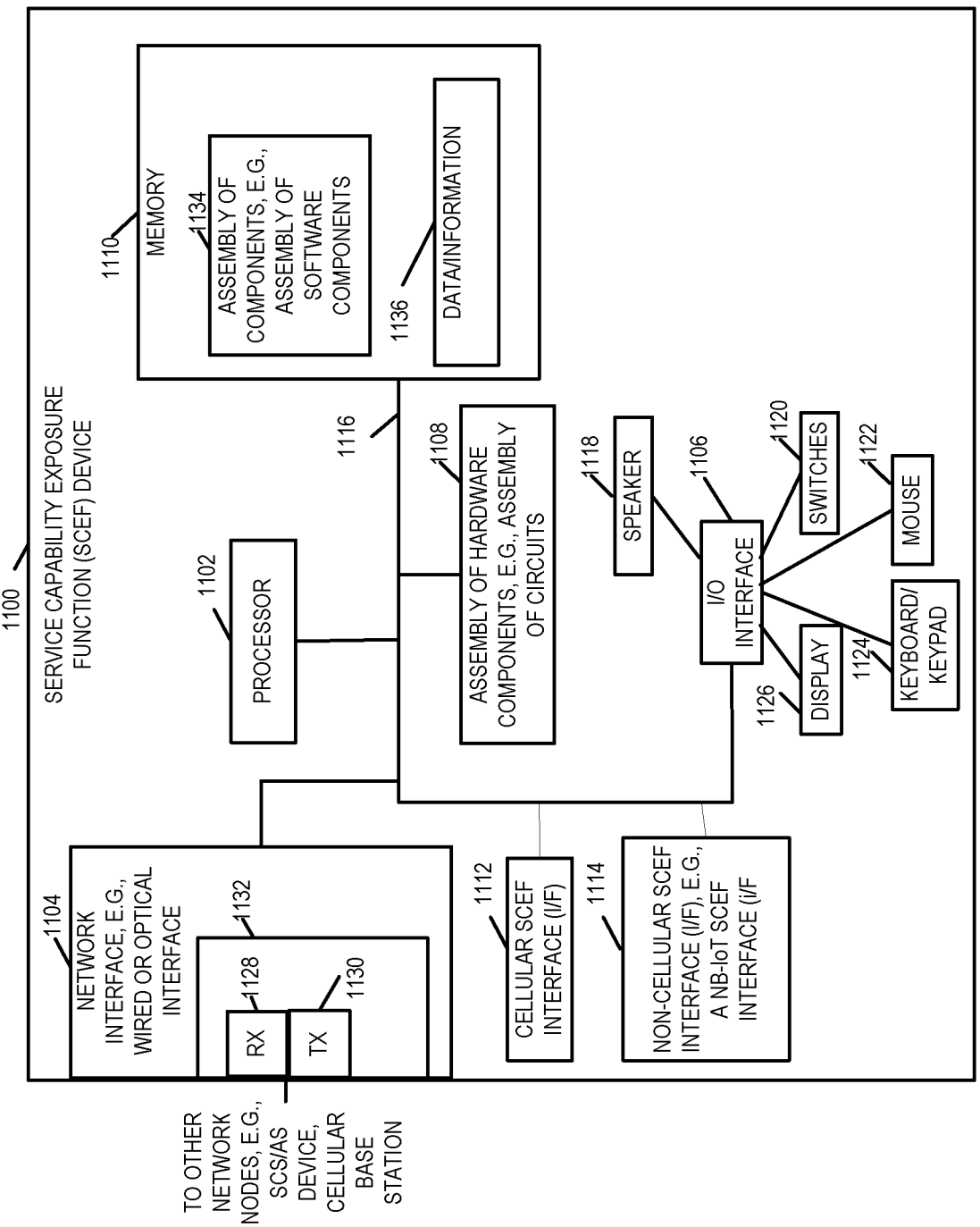
FIG. 9 is a drawing of an exemplary service capability exposure function (SCEF) device in accordance with an exemplary embodiment.

FIG. 9 is a drawing of an exemplary service capability exposure function (SCEF) device 1100 in accordance with an exemplary embodiment. Exemplary SCEF device 1100 of FIG. 9 is, e.g., SCEF device 424 of FIGS. 4, 5, and 6 or SCEF 308 of FIG. 3. Exemplary SCEF device 1100 includes a processor 1102, e.g., a CPU, a network interface 1104, e.g., a wired or optical interface, an I/O interface 1106, an assembly of hardware component 1108, e.g., an assembly of circuits, memory 1110, a cellular SCEF interface (I/F) 1112, and a non-cellular SCEF interface (I/F), e.g., a NB-IoT SCEF interface (I/F) 1114 coupled together via bus 1116 over which the various elements (1102, 1104, 1106, 1108, 1110, 1112, 1114) may interchange data and information. SCEF device 1100 further includes a speaker 1118, switches 1120, a mouse 1122, keyboard/keypad 1124, and display 1126, coupled to I/O interface 1106, via which the various I/O devices (1118, 1120, 1122, 1124, 1126) may interchange data and information with elements (1102, 1104, 1108, 1110, 1112, 1114). Network interface 1104 includes a receiver 1128, via which the SCEF device 1100 may receive signals, e.g., including messages, from other network nodes and a transmitter 1130 via which the SCEF device 1100 may send signals, e.g., including messages, to other network nodes. In some embodiments, the receiver 1128 and transmitter 1130 are included as part of a transceiver 1132. Exemplary network nodes include a service capability exposure function (SCS/AS) device, a mobility management entity (MME), a home subscriber server (HSS), a S-GW/P-GW and a cellular base station. Memory 1110 includes assembly of components 1134, e.g., an assembly of software components, and data/information 1136.

Figure 10:
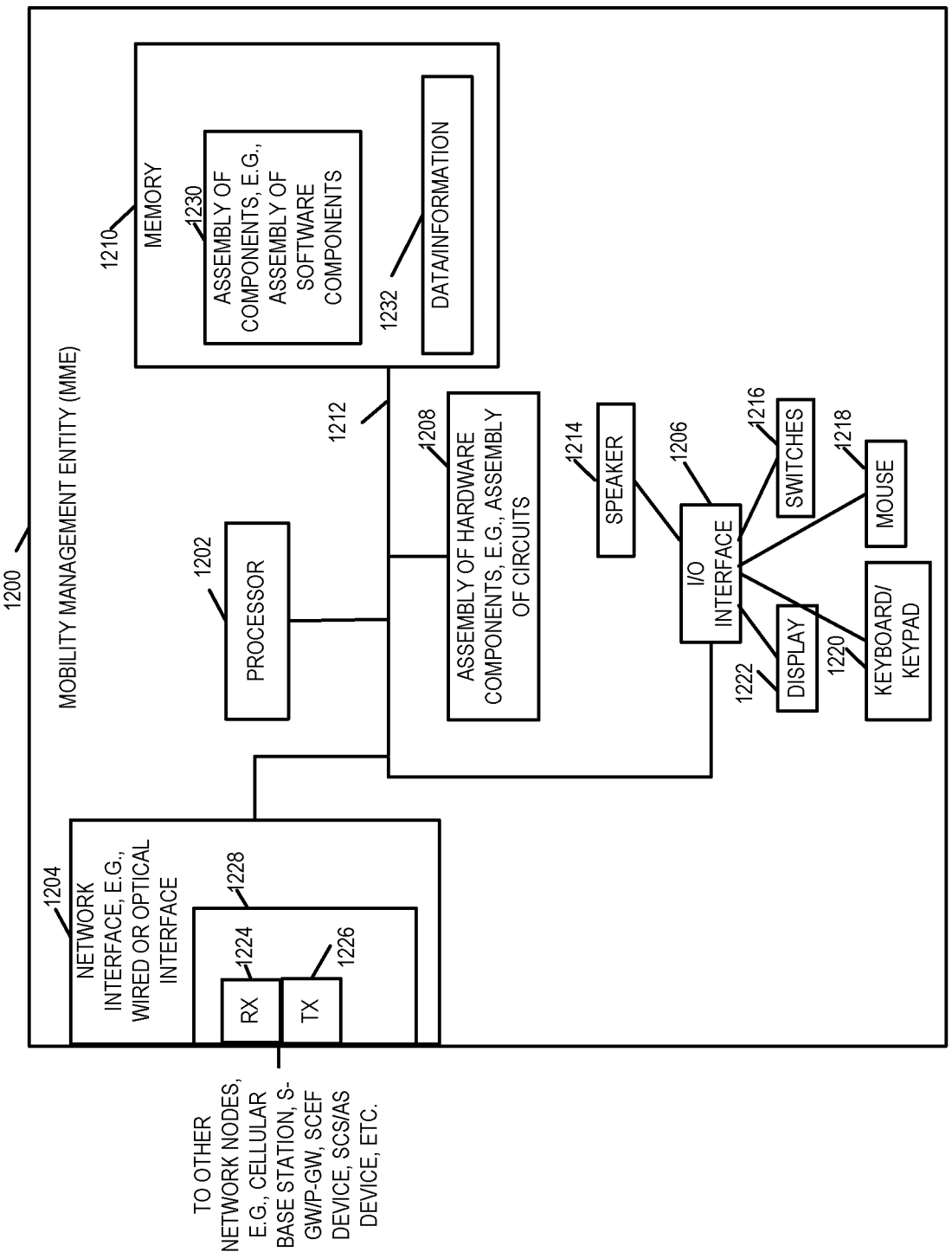
FIG. 10 is a drawing of an exemplary mobility management entity (MIME) in accordance with an exemplary embodiment.

FIG. 10 is a drawing of an exemplary mobility management entity (MME) 1200 in accordance with an exemplary embodiment. MME 1200 of FIG. 10 is, e.g. MME 418 of FIGS. 4, 5 and 6, or MME 316 of FIG. 3. Exemplary MME 1200 includes a processor 1202, e.g., a CPU, a network interface 1204, e.g., a wired or optical interface, an I/O interface 1206, an assembly of hardware component 1208, e.g., an assembly of circuits, and memory 1210 coupled together via bus 1212 over which the various elements (1202, 1204, 1206, 1208, 1210) may interchange data and information. MME 1200 further includes a speaker 1214, switches 1216, a mouse 1218, keyboard/keypad 1220, and display 1222, coupled to I/O interface 1206, via which the various I/O devices (1214, 1216, 1218, 1220, 1222) may interchange data and information with elements (1202, 1204, 1208, 1210). Network interface 1204 includes a receiver 1224, via which the MME 1200 may receive signals, e.g., including messages, from other network nodes and a transmitter 1226 via which the MME 1200 may send signals, e.g., including messages, to other network nodes. In some embodiments, the receiver 1224 and transmitter 1226 are included as part of a transceiver 1228. Exemplary network nodes include a SCS/AS device, a service capability exposure function (SCEF) device, a mobility management entity (MME), a 5-GW/P-GW, and a cellular base station. Memory 1210 includes assembly of components 1230, e.g., an assembly of software components, and data/information 1232.

Figure 11:
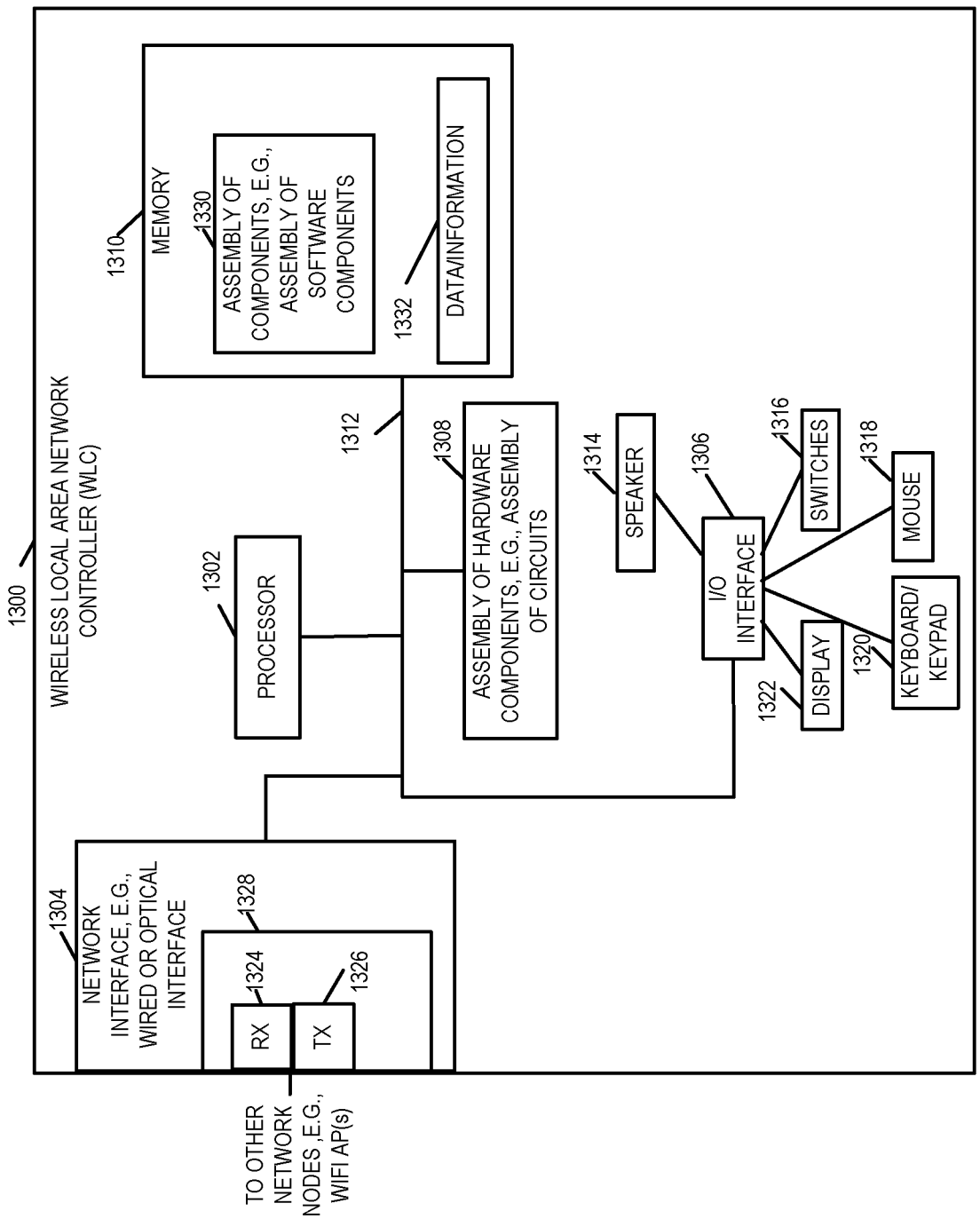
FIG. 11 is a drawing of an exemplary wireless local area network controller (WLC) in accordance with an exemplary embodiment.

FIG. 11 is a drawing of an exemplary wireless location area network controller (WLC) 1300 in accordance with an exemplary embodiment. WLC 1300 of FIG. 11 is, e.g., WLC 416 of FIGS. 4, 5 and 6, controller 210, e.g., a WLC of FIG. 2, or WLC 327 of FIG. 3. Exemplary WLC 1300 includes a processor 1302, e.g., a CPU, a network interface 1304, e.g., a wired or optical interface, an I/O interface 1306, an assembly of hardware component 1308, e.g., an assembly of circuits, and memory 1310 coupled together via bus 1312 over which the various elements (1302, 1304, 1306, 1308, 1310) may interchange data and information. WLC 1300 further includes a speaker 1314, switches 1316, a mouse 1318, keyboard/keypad 1320, and display 1322, coupled to I/O interface 1306, via which the various I/O devices (1314, 1316, 1318, 1320, 1322) may interchange data and information with elements (1302, 1304, 1308, 1310). Network interface 1304 includes a receiver 1324, via which the WLC 1300 may receive signals, e.g., including messages, from other network nodes, e.g., a SCEF device including a non-cellular interface, and a non-cellular access point, e.g. a WiFi AP, and a transmitter 1326 via which the WLC 1300 may send signals, e.g., including messages, to other network nodes, e.g., a SCEF device including a non-cellular interface, and a non-cellular access point, e.g. a WiFi AP. In some embodiments, the receiver 1324 and transmitter 1326 are included as part of a transceiver 1328. Memory 1310 includes assembly of components 1330, e.g., an assembly of software components, and data/information 1332.

Figure 12:
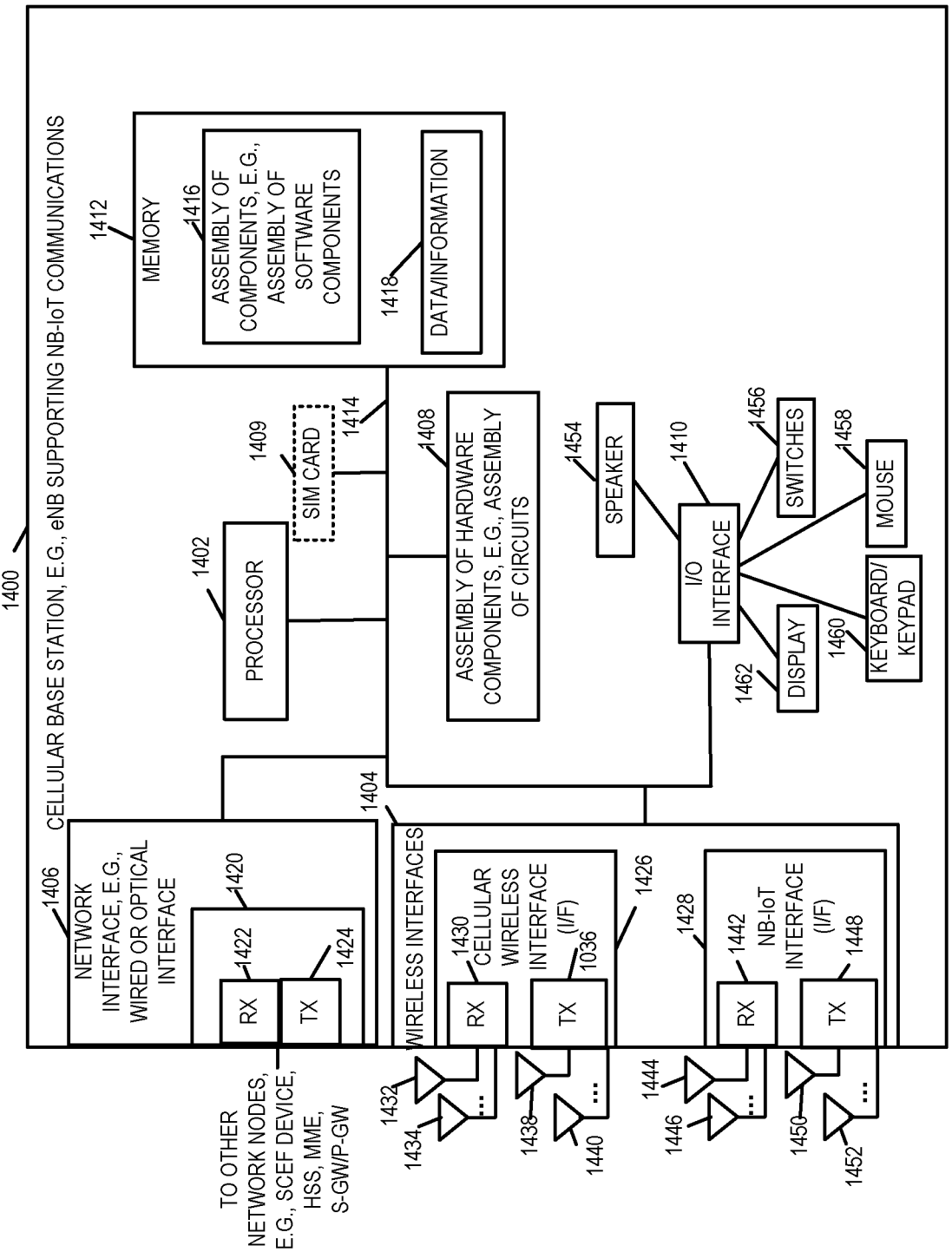
FIG. 12 is a drawing of an exemplary cellular base station, e.g., an eNodeB (eNB), supporting Narrow Band-Internet of Things (NB-IoT) communications in accordance with an exemplary embodiment.

FIG. 12 is a drawing of an exemplary cellular base station 1400, e.g., an eNodeB (eNB), supporting Narrow Band-Internet of Things (NB-IoT) communications in accordance with an exemplary embodiment. Cellular base station 1400 of FIG. 12 is, e.g., cellular base station 404 of FIGS. 4, 5 and 6, cell base station 218 of FIG. 2, or cell base station 324 of FIG. 3. Exemplary cellular base station 1400 includes a processor 1402, e.g., a CPU, a wireless interfaces 1404, a network interface 1406, e.g., a wired or optical interface, an I/O interface 1410, an assembly of hardware component 1408, e.g., an assembly of circuits, and memory 1412 coupled together via bus 1414 over which the various elements (1402, 1404, 1406, 1408, 1412) may interchange data and information. In some embodiments cellular base station 1400 further includes a SIM card 1409 coupled to bus 1414. Cellular base station 1400 further includes a speaker 1454, switches 1456, a mouse 1458, keyboard/keypad 1460, and display 1462, coupled to I/O interface 1410, via which the various I/O devices (1454, 1456, 1458, 1460, 1462) may interchange data and information with elements (1402, 1404, 1406, 1408, 1409, 1412).

Wireless interfaces 1404 includes a cellular wireless interface 1426 and a NB-IoT wireless interface 1428. Cellular wireless interface 1426 includes a receiver 1430 coupled to one or more receive antennas (1432, . . . , 1434) via which the cellular base station 1400 may receive cellular wireless signals from UE devices. Cellular wireless interface 1426 includes a transmitter 1036 coupled to one or more transmit antennas (1438, . . . , 1440) via which the cellular base station 1400 may transmit cellular wireless signals to UE devices. In some embodiments, the same antenna or antennas are used for the cellular wireless transmitter and the cellular wireless receiver.

NB-IoT wireless interface 1428 includes a receiver 1442 coupled to one or more receive antennas (1444, . . . , 1446) via which the cellular base station 1400 may receive NB-IoT signals from a non-cellular access point, e.g. a WiFi AP, supporting NB-IoT communications. NB-IoT wireless interface 1428 includes a transmitter 1448 coupled to one or more transmit antennas (1450, . . . , 1452) via which the cellular base station 1400 may transmit NB-IoT wireless signals to a non-cellular access point, e.g., a WiFi AP, supporting NB-IoT communications. In some embodiments, the same antenna or antennas are used for the NB-IoT wireless transmitter and the NB-IoT wireless receiver. In some embodiments, the same antenna or antennas are used by the cellular wireless interface 1426 and the NB-IoT wireless interface 1428.

Network interface 1406 includes a receiver 1422, via which the cellular base station 1400 may receive signals, e.g., including messages, from other network nodes and a transmitter 1424 via which the cellular base station 1400 may send signals, e.g., including messages. Exemplary network nodes coupled to cellular base station 1400 via network interface 1406 include a SCEF device, a HSS, a MME, a S-GW/P-GW, In some embodiments, the receiver 1422 and transmitter 1424 are included as part of a transceiver 1420. Memory 1412 includes assembly of components 1416, e.g., an assembly of software components, and data/information 1418.

Figure 13:
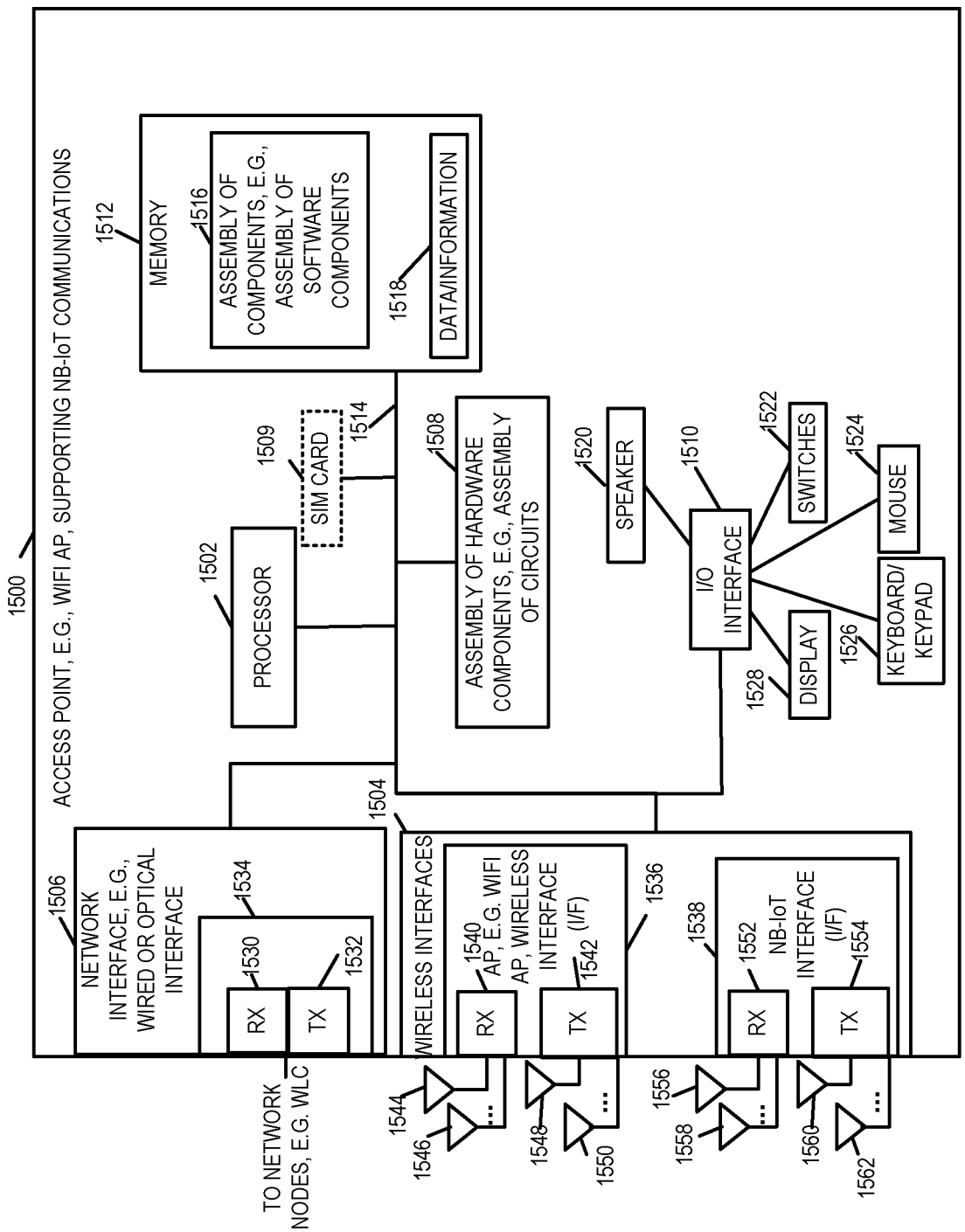
FIG. 13 is a drawing of an exemplary access point (AP), e.g., a WiFi access point (AP), supporting Narrow Band-Internet of Things (NB-IoT) communications in accordance with an exemplary embodiment.

FIG. 13 is a drawing of an exemplary access point (AP) 1500, e.g., a WiFi access point (AP), supporting Narrow Band-Internet of Things (NB-IoT) communications in accordance with an exemplary embodiment. Access point 1500 of FIG. 13 is, e.g., access point 402 of FIGS. 4, 5 and 6, WiFi AP 206 of FIG. 2, or non-cellular AP 326, e.g., a WiFi AP, of FIG. 3. Exemplary access point 1500 includes a processor 1502, e.g., a CPU, a wireless interfaces 1504, a network interface 1506, e.g., a wired or optical interface, an I/O interface 1510, an assembly of hardware component 1508, e.g., an assembly of circuits, and memory 1512 coupled together via bus 1514 over which the various elements (1502, 1504, 1506, 1508, 1512) may interchange data and information. In some embodiments access point 1500 further includes a SIM card 1509 coupled to bus 1514. Access point 1500 further includes a speaker 1520, switches 1522, a mouse 1524, keyboard/keypad 1526, and display 1528, coupled to I/O interface 1510, via which the various I/O devices (1520, 1522, 1524, 1526, 1528) may interchange data and information with elements (1502, 1504, 1506, 1508, 1509, 1512).

Wireless interfaces 1504 includes an access point, e.g., WiFi, wireless interface 1536 and a NB-IoT wireless interface 1538. AP, e.g., WiFi, wireless interface 1536 includes a receiver 1540 coupled to one or more receive antennas (1444, . . . , 1446) via which the AP 1500 may receive non-cellular, e.g. WiFi, wireless signals from UE devices. AP, e.g. WiFi, wireless interface 1536 includes a transmitter 1542 coupled to one or more transmit antennas (1548, . . . , 1550) via which the AP 1500 may transmit non-cellular, e.g., WiFi, wireless signals to UE devices. In some embodiments, the same antenna or antennas are used for the non-cellular AP, e.g. WiFi, wireless transmitter and the non-cellular AP, e.g., WiFi, wireless receiver.

NB-IoT wireless interface 1538 includes a receiver 1552 coupled to one or more receive antennas (1556, . . . , 1558) via which the AP 1500 may receive NB-IoT signals from a cellular base station supporting NB-IoT communications. NB-IoT wireless interface 1538 includes a transmitter 1554 coupled to one or more transmit antennas (1560, . . . , 1562) via which the AP 1500 may transmit NB-IoT wireless signals to a cellular base station supporting NB-IoT communications. In some embodiments, the same antenna or antennas are used for the NB-IoT wireless transmitter and the NB-IoT wireless receiver. In some embodiments, the same antenna or antennas are used by the non-cellular AP, e.g., WiFi, wireless interface 1536 and the NB-IoT wireless interface 1538.

Network interface 1506 includes a receiver 1530, via which the AP 1500 may receive signals, e.g., including messages, from other network nodes and a transmitter 1532 via which the AP 1500 may send signals, e.g., including messages. Exemplary network nodes coupled to AP 1500 via network interface 1506 include a WLC. In some embodiments, the receiver 1530 and transmitter 1532 are included as part of a transceiver 1534. Memory 1512 includes assembly of components 1516, e.g., an assembly of software components, and data/information 1518.

Figure 14:
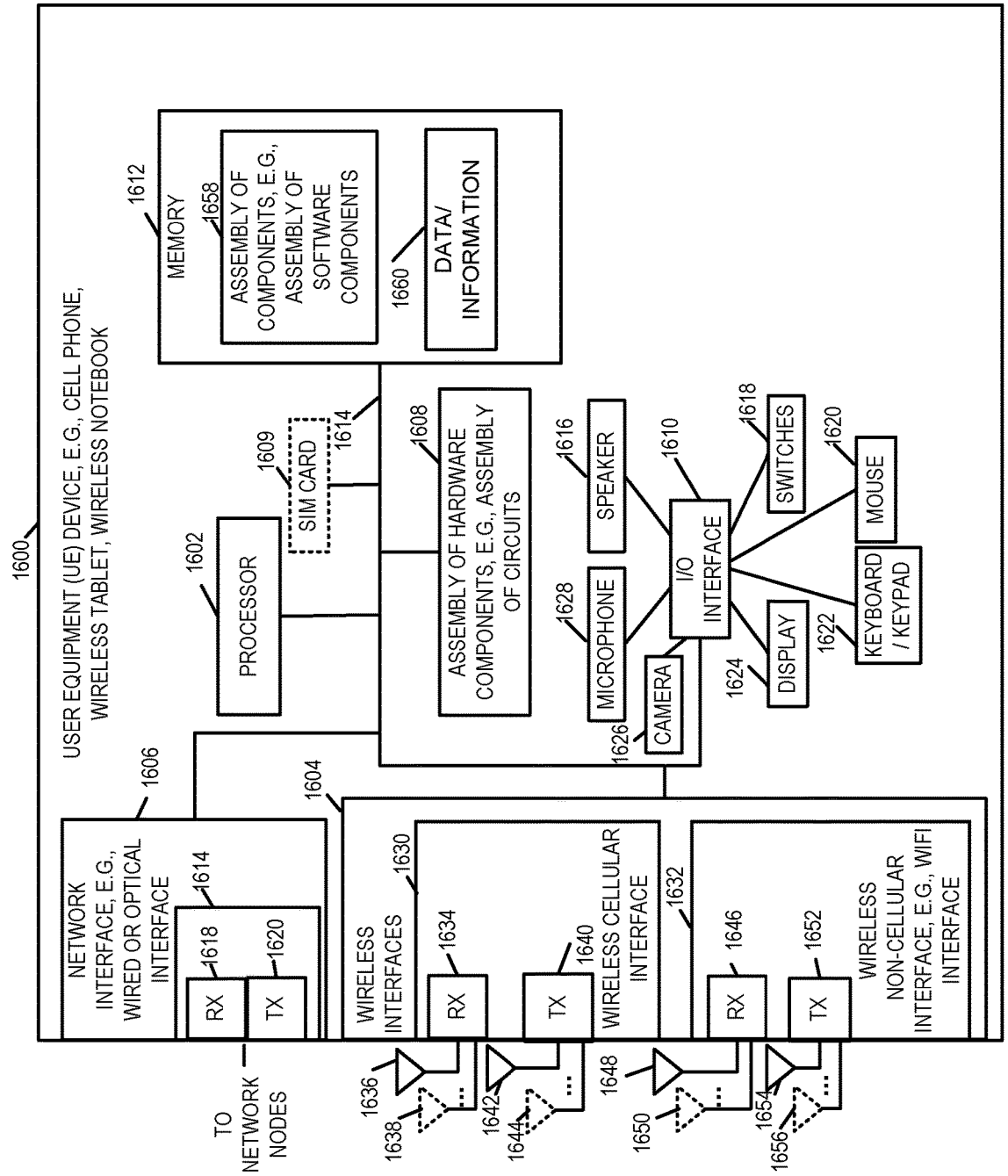
FIG. 14 is a drawing of an exemplary user equipment (UE) device, e.g., a cell phone, wireless tablet, wireless notebook, in accordance with an exemplary embodiment.

FIG. 14 is a drawing of an exemplary user equipment (UE) device 1600 supporting cellular and non-cellular, e.g., WiFi, communications, e.g., a cell phone, wireless tablet, wireless notebook, etc., in accordance with an exemplary embodiment. UE device 1600 of FIG. 14 is, e.g., UE 451 of FIGS. 4, 5 and 6, mobile UE device 230 of FIG. 2. Exemplary UE device 1600 includes a processor 1602, e.g., a CPU, a wireless interfaces 1604, a network interface 1606, e.g., a wired or optical interface, an I/O interface 1610, an assembly of hardware component 1608, e.g., an assembly of circuits, and memory 1612 coupled together via bus 1614 over which the various elements (1602, 1604, 1606, 1608, 1610, 1612) may interchange data and information. In some embodiments UE device 1600 further includes a SIM card 1609 coupled to bus 1614. UE device 1600 further includes a speaker 1616, switches 1618, a mouse 1620, keyboard/keypad 1622, display 1626, e.g., a touch-screen display, camera 1626 and microphone 1628 coupled to I/O interface 1610, via which the various I/O devices (1616, 1618, 1620, 1622, 1624, 1626, 1628) may interchange data and information with elements (1602, 1604, 1606, 1608, 1609, 1612).

Wireless interfaces 1604 includes a wireless cellular interface 1630 and a NB-IoT wireless non-cellular interface 1632, e.g. a WiFi interface. Cellular wireless interface 1630 includes a receiver 1634 coupled to one or more receive antennas (1636, . . . , 1638) via which the UE 1600 may receive cellular wireless signals from cellular base stations. Cellular wireless interface 1630 includes a transmitter 1640 coupled to one or more transmit antennas (1642, . . . , 1644) via which the UE device 1600 may transmit cellular wireless signals to cellular base stations. In some embodiments, the same antenna or antennas are used for the cellular wireless transmitter and the cellular wireless receiver.

Non-cellular wireless interface 1632, e.g., a WiFi interface, includes a receiver 1646 coupled to one or more receive antennas (1448, . . . , 1650) via which the UE device 1600 may receive non-cellular wireless signals, e.g., WiFi signals, from a non-cellular access point, e.g. a WiFi AP. Non-cellular wireless interface 1632, e.g., a WiFi wireless interface, includes a transmitter 1652 coupled to one or more transmit antennas (1654, . . . , 1656) via which the UE device 1600 may transmit non-cellular wireless signals, e.g., WiFi signals, to a non-cellular access point, e.g., a WiFi AP. In some embodiments, the same antenna or antennas are used for the non-cellular wireless transmitter 1646 and the non-cellular wireless receiver 1652. In some embodiments, the same antenna or antennas are used by the cellular wireless interface 1630 and the non-cellular, e.g. WiFi, wireless interface 1632.

Network interface 1606 includes a network receiver 1618, and a network transmitter 1620, via which the UE device 1600 may, and sometimes does, communicate with network nodes, via a wired or optical communications link. In some embodiments, the receiver 1618 and transmitter 1620 are included as part of a transceiver 1614. Memory 1612 includes assembly of components 1658, e.g., an assembly of software components, and data/information 1660.

Figure 15:
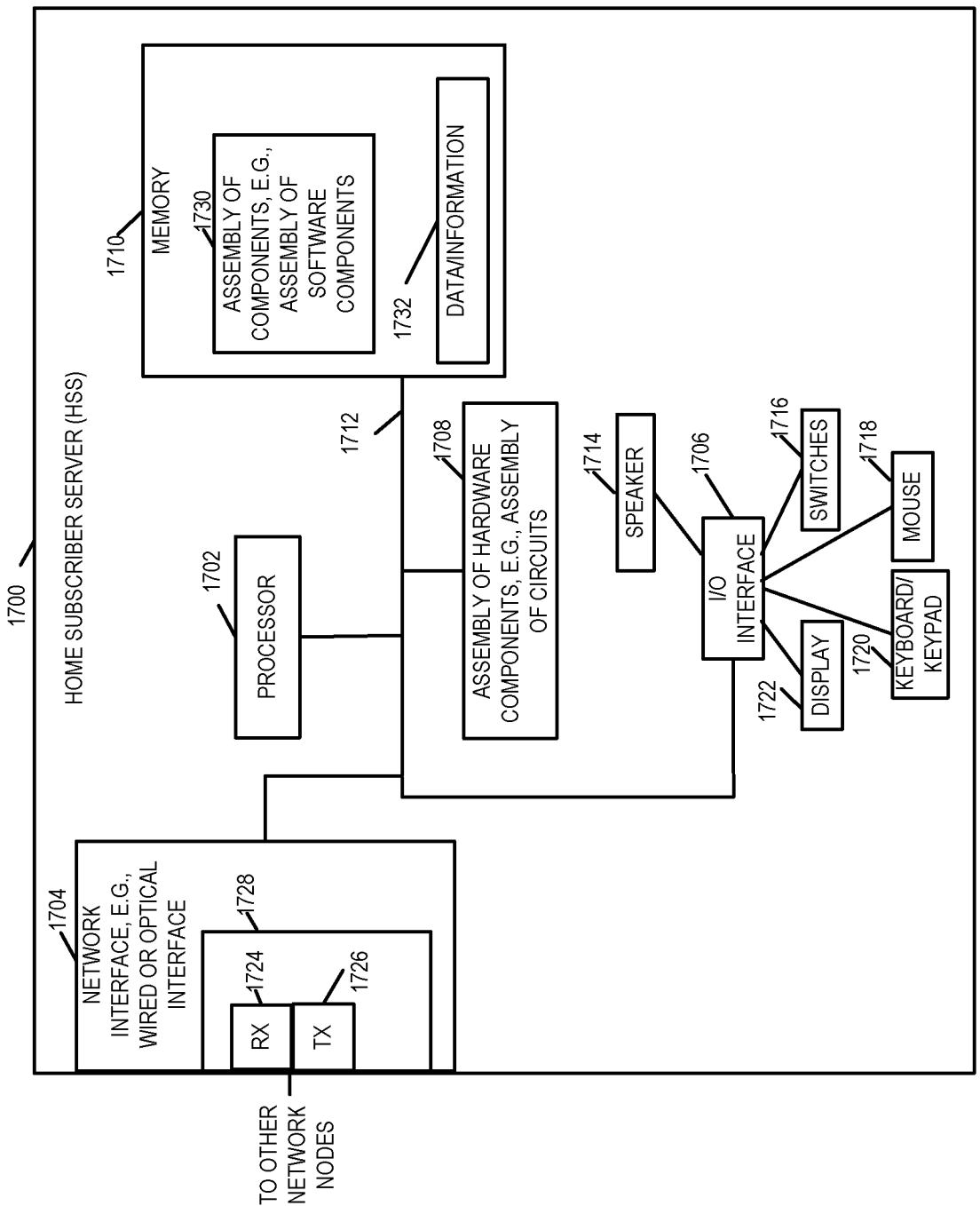
FIG. 15 is a drawing of an exemplary home subscriber server (HSS) in accordance with an exemplary embodiment.

FIG. 15 is a drawing of an exemplary home subscriber server (HSS) 1700 in accordance with an exemplary embodiment. HSS 1700 of FIG. 15 is, e.g. HSS 422 of FIGS. 4, 5, and 6, HSS 220 of FIG. 2, or HSS 314 of FIG. 3.

Exemplary HSS 1700 includes a processor 1702, e.g., a CPU, a network interface 1704, e.g., a wired or optical interface, an I/O interface 1706, an assembly of hardware component 1708, e.g., an assembly of circuits, and memory 1710 coupled together via bus 1712 over which the various elements (1702, 1704, 1706, 1708, 1710) may interchange data and information. HSS 1700 further includes a speaker 1714, switches 1716, a mouse 1718, keyboard/keypad 1720, and display 1722, coupled to I/O interface 1706, via which the various I/O devices (1714, 1716, 1718, 1720, 1722) may interchange data and information with elements (1702, 1704, 1708, 1710). Network interface 1704 includes a receiver 1724, via which the HSS 1700 may receive signals, e.g., including messages, from other network nodes and a transmitter 1726 via which the HSS 100 may send signals, e.g., including messages, to other network nodes. In some embodiments, the receiver 1724 and transmitter 1726 are included as part of a transceiver 1728. Memory 1710 includes assembly of components 1730, e.g., an assembly of software components, and data/information 1732.

Figure 16:
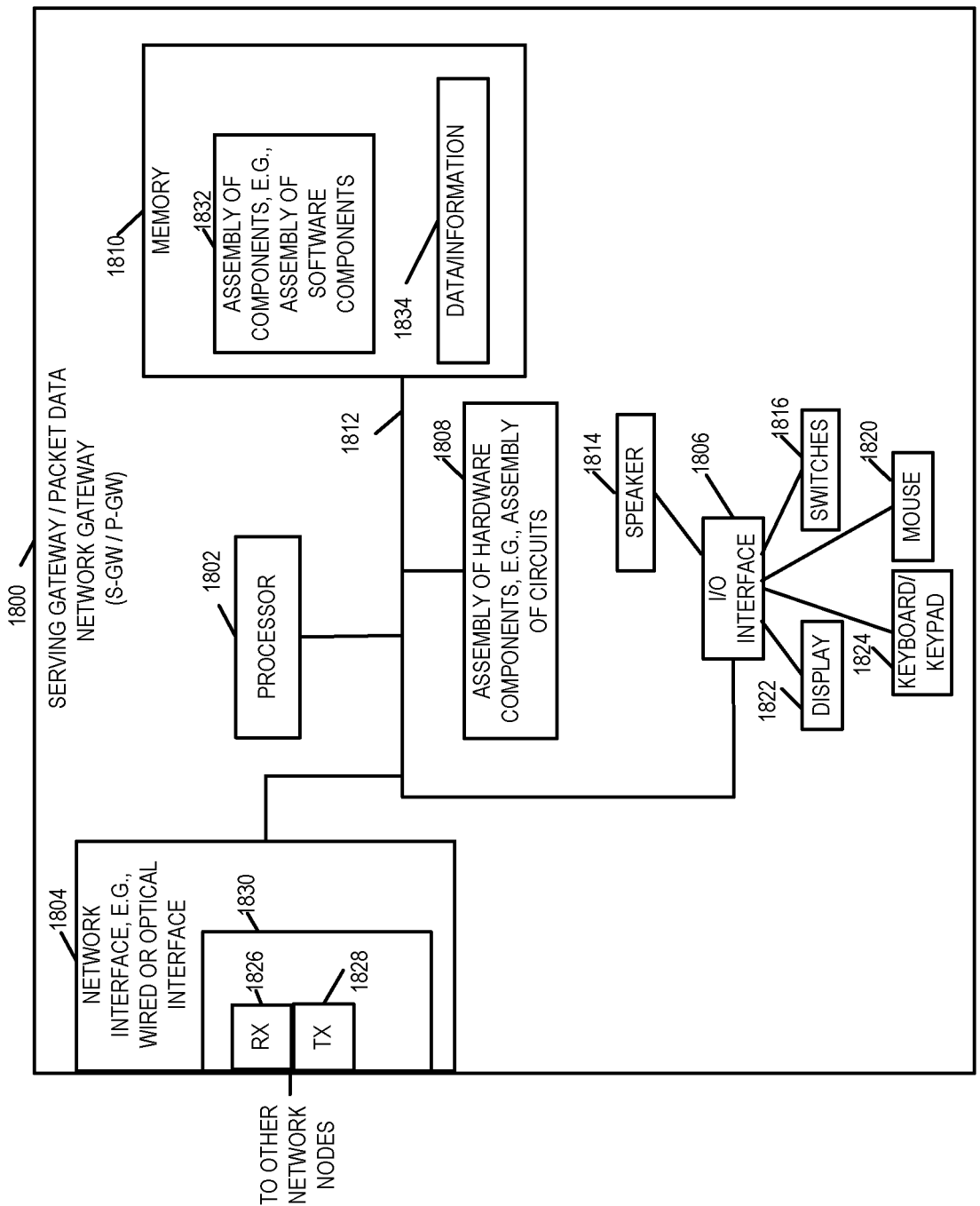
FIG. 16 is a drawing of an exemplary serving gateway/packet data network gateway (S-GW/P-GW) in accordance with an exemplary embodiment.

FIG. 16 is a drawing of an exemplary serving gateway/packet data network gateway (S-GW/P-GW) 1800 in accordance with an exemplary embodiment. S-GW/P-GW device 1800 of FIG. 16 is, e.g., S-GW/P-GW 420 of FIGS. 4, 5 and 6, the combination of S-gateway 224 and P-gateway 226 of FIG. 2, or the combination of SGW 318 and PGW 310 of FIG. 3. Exemplary S-GW/P-GW device 1800 includes a processor 1802, e.g., a CPU, a network interface 1804, e.g., a wired or optical interface, an I/O interface 1806, an assembly of hardware component 1808, e.g., an assembly of circuits, and memory 1810 coupled together via bus 1812 over which the various elements (1802, 1804, 1806, 1808, 1810) may interchange data and information. S-GW/P-GW device 1800 further includes a speaker 1814, switches 1816, a mouse 1818, keyboard/keypad 1820, and display 1822, coupled to I/O interface 1806, via which the various I/O devices (1814, 1816, 1818, 1820, 1822) may interchange data and information with elements (1802, 1804, 1808, 1810). Network interface 1804 includes a receiver 1826, via which the S-GW/P-GW device 1800 may receive signals, e.g., including messages, from other network nodes and a transmitter 1628 via which the S-GW/P-GW device 1800 may send signals, e.g., including messages, to other network nodes. In some embodiments, the receiver 1826 and transmitter 1828 are included as part of a transceiver 1830. Memory 1810 includes assembly of components 1832, e.g., an assembly of software components, and data/information 1834.

In some embodiments, S-GW/P-GW device 1800 is alternatively implemented, e.g., in a cellular, e.g., 3GPP, network, as two distinct devices, e.g., a S-GW device and a P-GW device, which are coupled together within cellular network. In some such embodiments, the S-GW device and P-GW device each include a network interface including a receiver and a transmitter, a processor, an I/O interface, I/O devices, an assembly of hardware components, and a memory including a assembly of components and data/information.

Figure 17A:
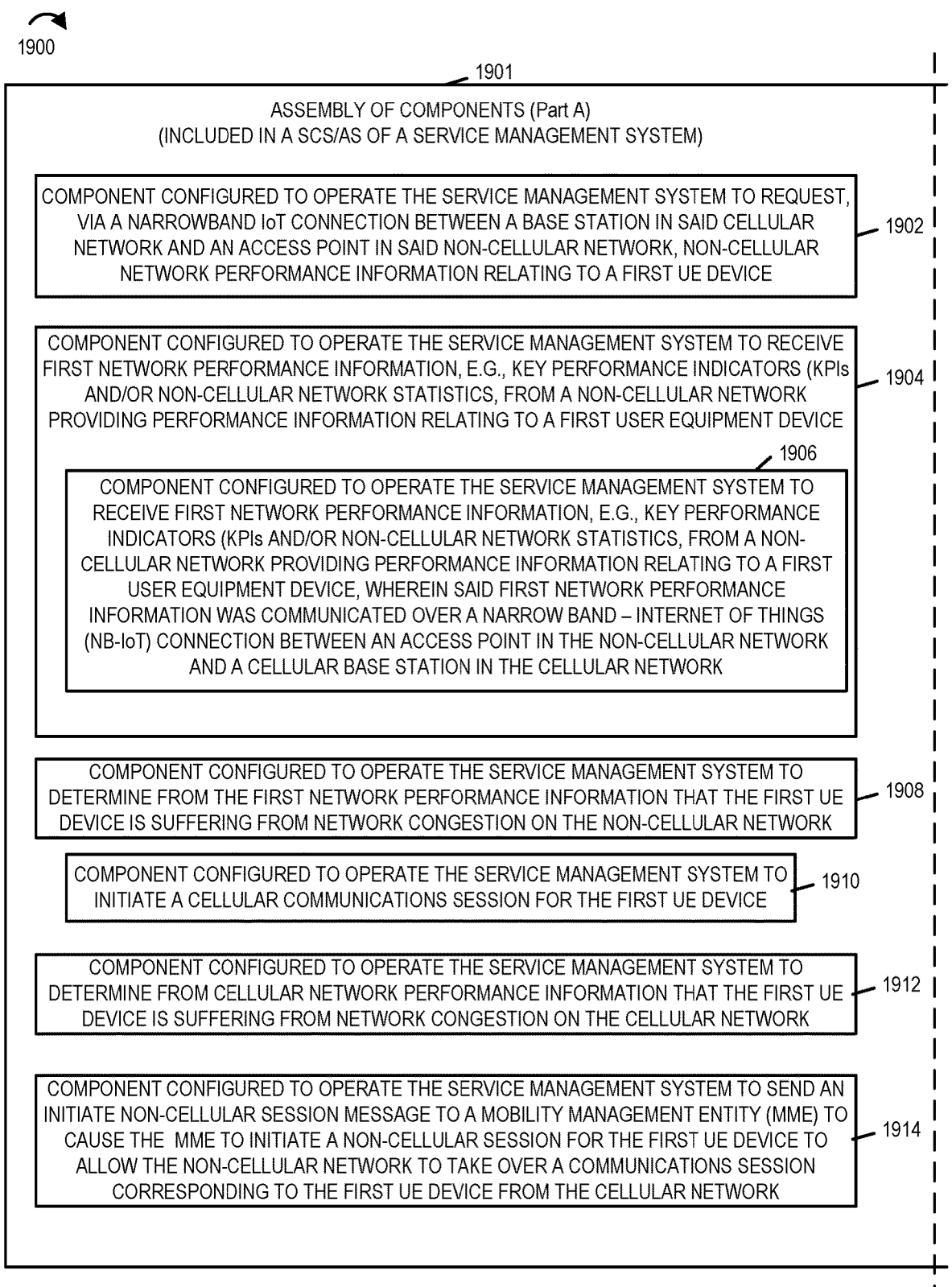
FIG. 17A is a drawing of a first part of an exemplary assembly of components which may be included in a service capability server/application server (SCS/AS) device in accordance with an exemplary embodiment.
Figures 17, 17A, 17B:
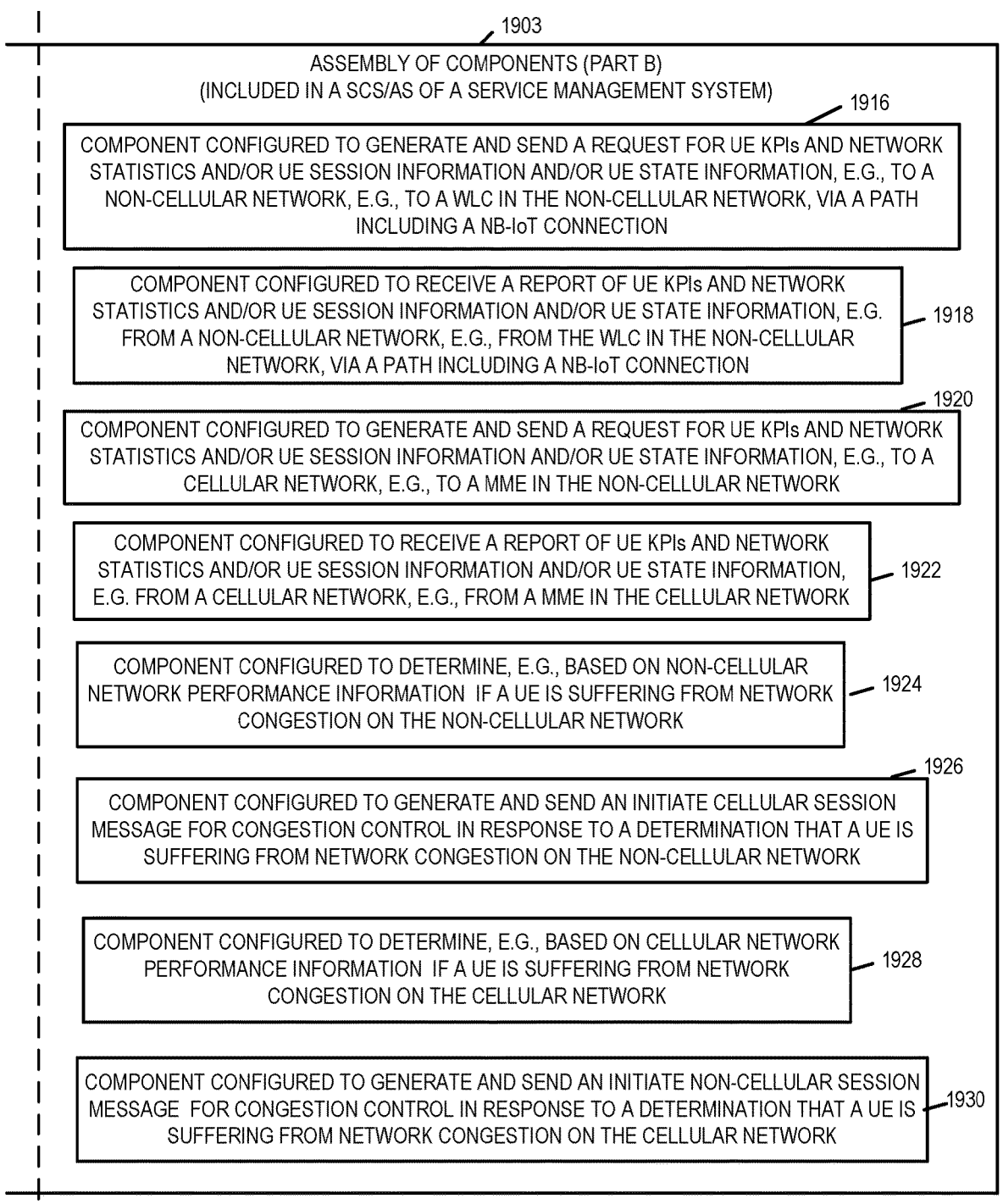
FIG. 17B is a drawing of a second part of an exemplary assembly of components which may be included in a service capability server/application server (SCS/AS) device in accordance with an exemplary embodiment.
FIG. 17 comprises the combination of FIG. 17A and FIG. 17B.

FIG. 17, comprising the combination of FIG. 17A and FIG. 17B, is a drawing of an exemplary assembly of components 1900, comprising the combination of Part A 1901 and Part B 1903, which may be included in a service capability server/application server (SC S/AS) device, e.g. SCS/AS 1000 of FIG. 8 or SC S/AS 426 of FIGS. 4, 5 and 6, in accordance with an exemplary embodiment.

The components in the assembly of components 1900 can, and in some embodiments are, implemented fully in hardware within a processor, e.g., processor 1002, e.g., as individual circuits. The components in the assembly of components 1900 can, and in some embodiments are, implemented fully in hardware within the assembly of hardware components 1008, e.g., as individual circuits corresponding to the different components. In other embodiments some of the components are implemented, e.g., as circuits, within processor 1002 with other components being implemented, e.g., as circuits within assembly of components 1008, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1010 of the SC S/AS device 1000, with the components controlling operation of SC S/AS device 1000 to implement the functions corresponding to the components when the components are executed by a processor e.g., processor 1002. In some such embodiments, the assembly of components 1900 is included in the memory 1010 as assembly of software components 1030. In still other embodiments, various components in assembly of components 1900 are implemented as a combination of hardware and software, e.g., with another circuit external to the processor providing input to the processor which then under software control operates to perform a portion of a component's function. When implemented in software the components include code, which when executed by a processor, e.g., processor 1002, configure the processor to implement the function corresponding to the component. In embodiments where the assembly of components 1900 is stored in the memory 1010, the memory 1010 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the SC S/AS device 1000 or elements therein such as the processor 1002, to perform the functions of corresponding steps illustrated and/or described in the method of one or more of the flowcharts, signaling diagrams and/or described with respect to any of the Figures. Thus the assembly of components 1900 includes various components that perform functions of corresponding one or more described and/or illustrated steps of an exemplary method.

Assembly of components 1900 includes a component 1902 configured to operate the service management system to request, via a narrowband IoT connection between a base station in said cellular network and an access point in said non-cellular network, non-cellular network performance information relating to a first UE device, and a component 1904 configured to operate the service management system to receive first network performance information, e.g. key performance indicators (KPIs) and/or non-cellular network statistics, from a non-cellular network proving performance information relating to a first user equipment (UE) device. Component 1904 includes a component 1906 configured to operate the service management system to receive first network performance information, e.g. key performance indicators (KPIs) and/or non-cellular network statistics, from a non-cellular network proving performance information relating to a first user equipment (UE) device, wherein said first network performance information was communicated over a narrow band-Internet of Things (NB-IoT) connection between an access point in the non-cellular network and a cellular base station in the cellular network.

Assembly of components 1900 further includes a component 1908 configured to operate the service management system to determine from the first network performance information that the first UE device is suffering from network congestion in the non-cellular network, a component 1910 configured to operate the service management system to initiate a cellular communications session for the first UE device, a component 1912 configured to operate the service management system to determine from cellular network performance information that the first UE device is suffering from network congestion on the cellular network, and a component 1914 configured to operate the service management system to send an initiate non-cellular session message to a mobility management entity (MME) to cause the MME to initiate a non-cellular session for the first UE device to allow the non-cellular network to take over a communications session corresponding to the first UE device from the cellular network.

Assembly of components 1900 further includes a component 1916 configured to generate and send a request for UE KPIs and network statistics and/or UE session information and/or UE state information, e.g., to a non-cellular network, e.g., to a WLC in the non-cellular network, via a path including a NB-IoT connection, e.g., a NB-IoT wireless link between a cellular base station in the cellular network and an access point, e.g. a WiFi AP in the non-cellular network, a component 1918 configured to receive a report of UE KPIs and network statistics and/or UE session information and/or UE state information, e.g., from a non-cellular network, e.g. from the WLC in the non-cellular network, via a path including a NB-IoT connection, a component 1920 configured to generate and send a request for UE KPIs and network statistics and/or UE session information and/or UE state information, e.g., to a cellular network, e.g., to a mobility management entity (MME) in the cellular network, and a component 1922 configured to receive a report of UE KPIs and network statistics and/or UE session information and/or UE state information, e.g., from a cellular network, e.g., from a MME in the cellular network. Assembly of components 1900 further includes a component 1924 configured to determine, e.g. based on non-cellular network performance information if a UE is suffering from network congestion on the non-cellular network, and a component 1926 configured to generate and send an initiate cellular session message for congestion control in response to a determination that a UE is suffering from network congestion on the non-cellular network. Assembly of components 1900 further includes a component 1928 configured to determine, e.g. based on cellular network performance information, if a UE is suffering from network congestion in the cellular network, and a component 1930 configured to generate and send an initiate non-cellular session message for congestion control in response to a determination that a UE is suffering from network congestion on the cellular network.

Figure 18:
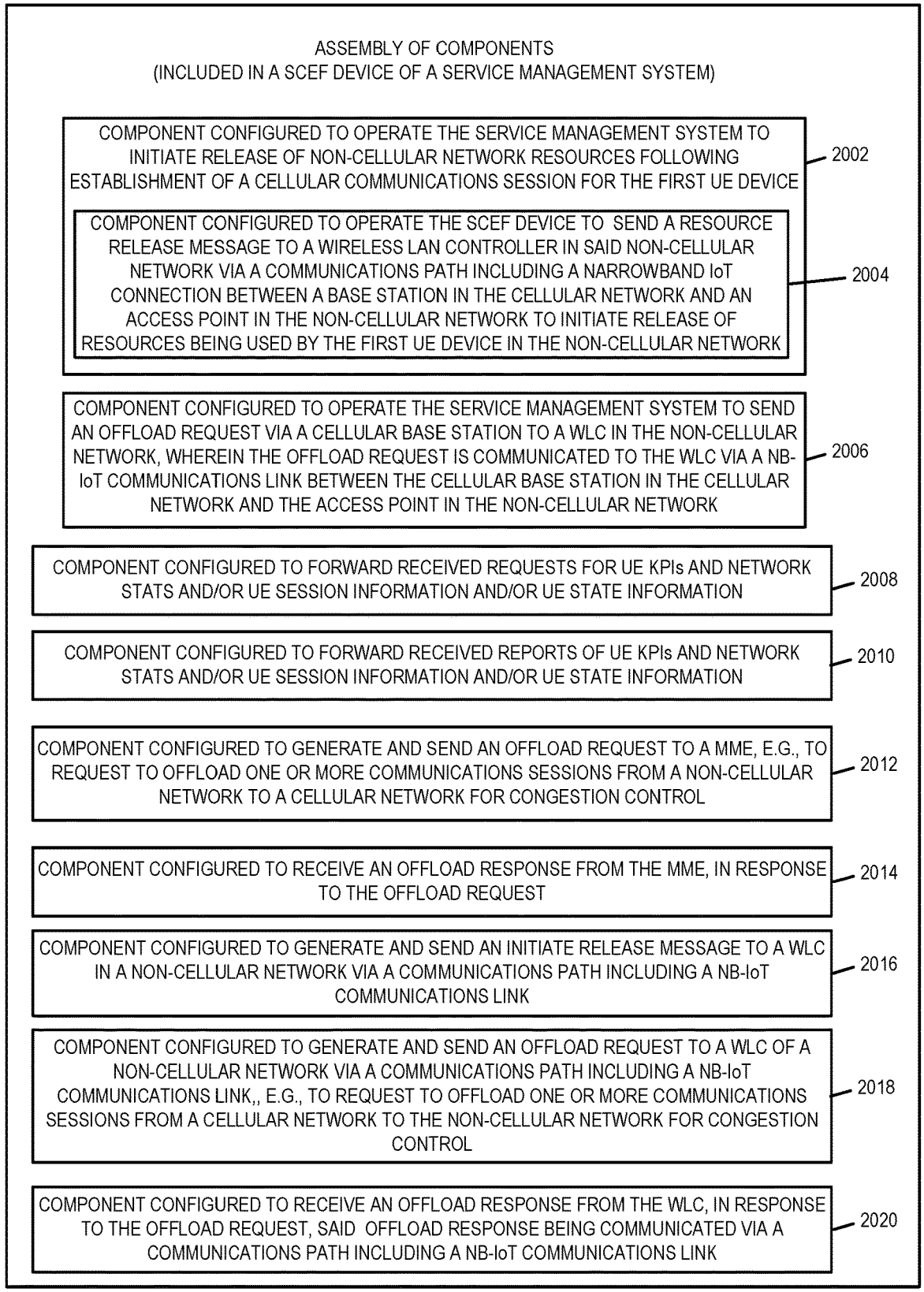
FIG. 18 is a drawing of an exemplary assembly of components which may be included in a service capability exposure function (SCEF) device in accordance with an exemplary embodiment.

FIG. 18 is a drawing of an exemplary assembly of components 2000 which may be included in a service capability exposure function (SCEF) device, e.g., SCEF device 1100 of FIG. 9 or SCEF device 424 of FIGS. 4, 5 and 6, in accordance with an exemplary embodiment.

The components in the assembly of components 2000 can, and in some embodiments are, implemented fully in hardware within a processor, e.g., processor 1102, e.g., as individual circuits. The components in the assembly of components 2000 can, and in some embodiments are, implemented fully in hardware within the assembly of hardware components 1108, e.g., as individual circuits corresponding to the different components. In other embodiments some of the components are implemented, e.g., as circuits, within processor 1102 with other components being implemented, e.g., as circuits within assembly of components 1108, external to and coupled to the processor 1102. As should be appreciated the level of integration of components on the processor and/or with some components being external to the processor may be one of design choice. Alternatively, rather than being implemented as circuits, all or some of the components may be implemented in software and stored in the memory 1110 of the SCEF device 1100, with the components controlling operation of SCEF device 1100 to implement the functions corresponding to the components when the components are executed by a processor e.g., processor 1102. In some such embodiments, the assembly of components 2000 is included in the memory 1110 as assembly of software components 1134. In still other embodiments, various components in assembly of components 2000 are implemented as a combination of hardware and software, e.g., with another circuit external to the processor providing input to the processor which then under software control operates to perform a portion of a component's function.

When implemented in software the components include code, which when executed by a processor, e.g., processor 1102, configure the processor to implement the function corresponding to the component. In embodiments where the assembly of components 2000 is stored in the memory 1110, the memory 1110 is a computer program product comprising a computer readable medium comprising code, e.g., individual code for each component, for causing at least one computer, e.g., processor 1102, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 18 control and/or configure the SCEF device 1100 or elements therein such as the processor 1102, to perform the functions of corresponding steps illustrated and/or described in the method of one or more of the flowcharts, signaling diagrams and/or described with respect to any of the Figures. Thus the assembly of components 2000 includes various components that perform functions of corresponding one or more described and/or illustrated steps of an exemplary method.

Assembly of components 2000 includes a component 2002 configured to operate the service management system to initiate release of non-cellular resources following establishment of a cellular communications session for the first UE device. Component 2002 includes a component 2004 configured to operate the SCEF device to send a resource release message to a wireless LAN controller in said non-cellular network via a narrowband IoT connection between a base station in the cellular network and an access point in the non-cellular network to initiate release of resources being used by the first UE device in non-cellular network. Assembly of components 2000 further includes a component 2006 configured to operate the service management system to send an offload request via cellular base station to a WLC in the non-cellular network, wherein the offload request is communicated to the WLC via a NB-IoT communications link between the cellular base station in the cellular network and the access point in the non-cellular network.

Assembly of components 2000 further includes a component 2008 configured to forward received requests for UE KPIs and network statistics and/or UE session information and/or UE state information, e.g. received requests from an SCS/AS being sent to a WLC of a non-cellular network via a path including an NB-IoT communications link, and received requests from the SC S/AS being sent to a MME of a cellular network. Assembly of components 2000 further includes a component 2010 configured to forward received reports of UE KPIs and network statistics and/or UE session information and/or UE state information, e.g., received reports sent by a WLC of a non-cellular network via a path including an NB-IoT communications link, and received reports sent by a MME of a cellular network, e.g. with the forwarding destination being an SCS/AS. Assembly of components 2000 further includes a component 2012 configured to send an offload request to a MME, e.g., to request to offload one or more communications sessions from a non-cellular network to a cellular network for congestion control, a component 2014 configured to received an offload response from the MME in response to the offload request, e.g. an offload response indicating that the request is granted, and a component 2016 configured to generate and send an initiate release message to a WLC of a non-cellular network via a communications path including a NB-IoT communications link, e.g., to initiate release of resources in the non-cellular network for a communications session being taken over by the cellular network. Assembly of components 2000 further includes a component 2018 configured to generate and sends an offload request to a WLC of a non-cellular network via a communications path including a NB-IoT communications link, e.g., to request to offload one or more communications sessions from a cellular network to the non-cellular network for congestion control, and a component 2020 configured to receive an offload response from the WLC, in response to the offload request, said offload response being communicated via a communications path including a NB-IoT communications link.

FIG. 19 is a drawing of an exemplary assembly of components 2100 which may be included in a wireless location area network controller (WLC), e.g. WLC 1300 of FIG. 11 or WLC 416 or FIGS. 4, 5 and 6, in accordance with an exemplary embodiment.

The components in the assembly of components 2100 can, and in some embodiments are, implemented fully in hardware within a processor, e.g., processor 1302, e.g., as individual circuits. The components in the assembly of components 2100 can, and in some embodiments are, implemented fully in hardware within the assembly of hardware components 1308, e.g., as individual circuits corresponding to the different components. In other embodiments some of the components are implemented, e.g., as circuits, within processor 1302 with other components being implemented, e.g., as circuits within assembly of components 1308, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1310 of the WLC 1300, with the components controlling operation of WLC 1300 to implement the functions corresponding to the components when the components are executed by a processor e.g., processor 1302. In some such embodiments, the assembly of components 2100 is included in the memory 1310 as assembly of software components 1330. In still other embodiments, various components in assembly of components 2100 are implemented as a combination of hardware and software, e.g., with another circuit external to the processor providing input to the processor which then under software control operates to perform a portion of a component's function. When implemented in software the components include code, which when executed by a processor, e.g., processor 1302, configure the processor to implement the function corresponding to the component. In embodiments where the assembly of components 2100 is stored in the memory 1310, the memory 1310 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 19 control and/or configure the WLC 1300 or elements therein such as the processor 1302, to perform the functions of corresponding steps illustrated and/or described in the method of one or more of the flowcharts, signaling diagrams and/or described with respect to any of the Figures. Thus the assembly of components 2100 includes various components that perform functions of corresponding one or more described and/or illustrated steps of an exemplary method.

Assembly of components 2100 includes a component 2102 configured to operate the WLC to response to said resource release message by operating the WLC to signal the access point serving the first UE device to release communications resources being used by the first UE device, e.g., operate the WLC to send a congestion relief command to the access point. Assembly of components 2102 further includes a component 2104 configured to operate the WLC to send an offload response, e.g., an offload response indicating that the non-cellular network will accept the hand over of the first UE device, to the service management system via a NB-IoT communications link, and a component 2106 configured to operate the WLC to send a takeover command to the non-cellular access point signaling the non-cellular access point that it is to take over one or more communications sessions corresponding to the first UE device that were previously being supported by the cellular base station.

FIG. 20 is a drawing of an exemplary assembly of components 2200 which may be included in an access point (AP), e.g., a WiFi access point (AP), supporting Narrow Band-Internet of Things (NB-IoT) communications, e.g., AP 1500 of FIG. 13 or AP 402 of FIGS. 4, 5 and 6, in accordance with an exemplary embodiment.

The components in the assembly of components 2200 can, and in some embodiments are, implemented fully in hardware within a processor, e.g., processor 1502, e.g., as individual circuits. The components in the assembly of components 2200 can, and in some embodiments are, implemented fully in hardware within the assembly of hardware components 1508, e.g., as individual circuits corresponding to the different components. In other embodiments some of the components are implemented, e.g., as circuits, within processor 1502 with other components being implemented, e.g., as circuits within assembly of components 1508, external to and coupled to the processor 1502. As should be appreciated the level of integration of components on the processor and/or with some components being external to the processor may be one of design choice. Alternatively, rather than being implemented as circuits, all or some of the components may be implemented in software and stored in the memory 1512 of the AP 1500, with the components controlling operation of AP 1500 to implement the functions corresponding to the components when the components are executed by a processor e.g., processor 1502. In some such embodiments, the assembly of components 2200 is included in the memory 1512 as assembly of software components 1516. In still other embodiments, various components in assembly of components 2200 are implemented as a combination of hardware and software, e.g., with another circuit external to the processor providing input to the processor which then under software control operates to perform a portion of a component's function. When implemented in software the components include code, which when executed by a processor, e.g., processor 1502, configure the processor to implement the function corresponding to the component. In embodiments where the assembly of components 2200 is stored in the memory 1512, the memory 1512 is a computer program product comprising a computer readable medium comprising code, e.g., individual code for each component, for causing at least one computer, e.g., processor 1502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 20 control and/or configure the AP 1500 or elements therein such as the processor 1502, to perform the functions of corresponding steps illustrated and/or described in the method of one or more of the flowcharts, signaling diagrams and/or described with respect to any of the Figures. Thus the assembly of components 2200 includes various components that perform functions of corresponding one or more described and/or illustrated steps of an exemplary method.

Assembly of components 2200 includes a component 2202 configured to operate the access point to support a NB-IoT communications link between the AP of the non-cellular network and a cellular base station of a cellular network, e.g. for use in network load management and/or facilitating UE session handover between the cellular network and the non-cellular network, and a component 2204 configured to operate the access point to participate in a data session which was handed off from the cellular network.

Figure 21:
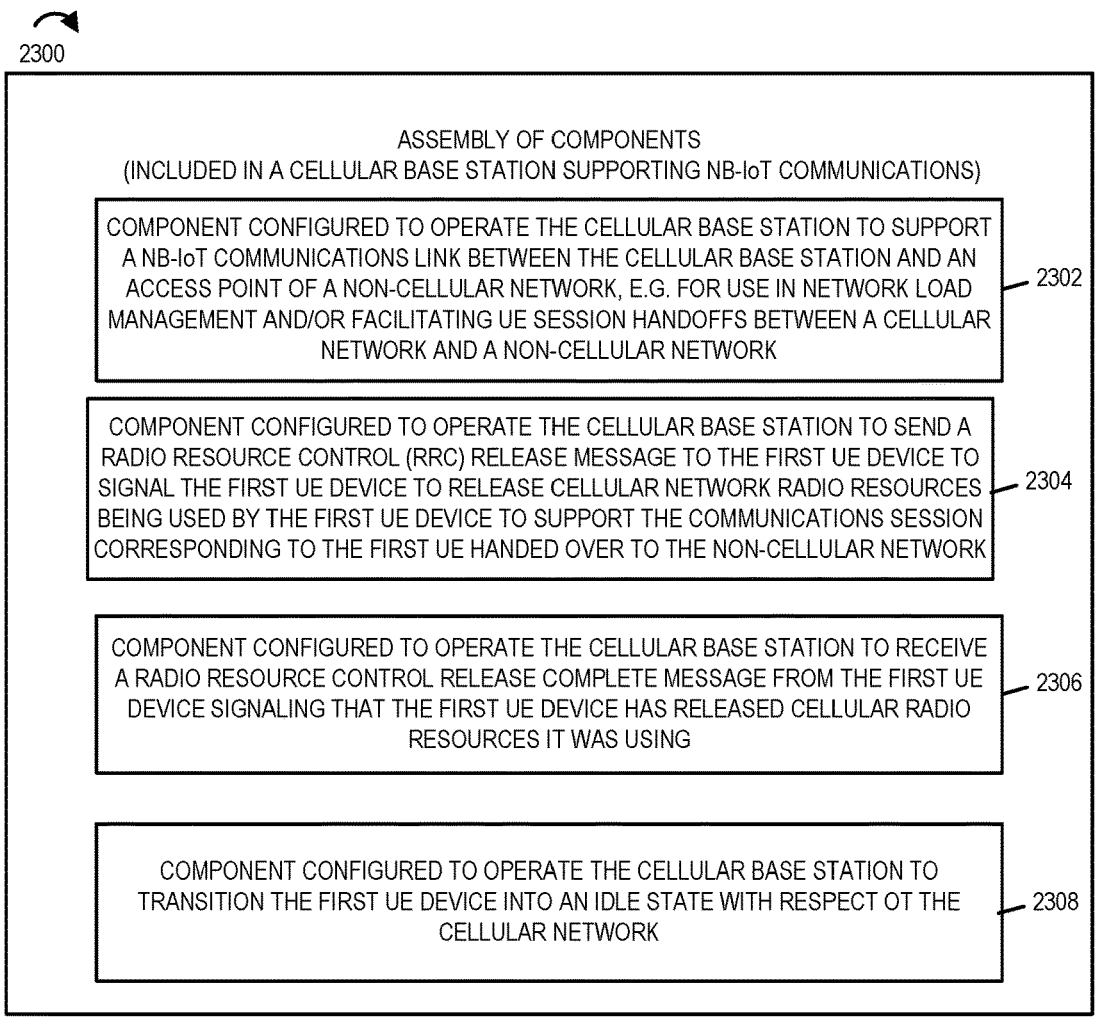
FIG. 21 is a drawing of an exemplary assembly of components which may be included in an exemplary cellular base station, e.g., an eNodeB (eNB), supporting Narrow Band-Internet of Things (NB-IoT) communications in accordance with an exemplary embodiment.

FIG. 21 is a drawing of an exemplary assembly of components 2300 which may be included in an exemplary cellular base station, e.g., an eNodeB (eNB), supporting Narrow Band-Internet of Things (NB-IoT) communications, e.g., cellular base station 1400 of FIG. 12 or cellular base station 404 of FIGS. 4, 5 and 6, in accordance with an exemplary embodiment.

The components in the assembly of components 2300 can, and in some embodiments are, implemented fully in hardware within a processor, e.g., processor 1402, e.g., as individual circuits. The components in the assembly of components 2300 can, and in some embodiments are, implemented fully in hardware within the assembly of hardware components 1408, e.g., as individual circuits corresponding to the different components. In other embodiments some of the components are implemented, e.g., as circuits, within processor 1402 with other components being implemented, e.g., as circuits within assembly of components 1408, external to and coupled to the processor 1402. As should be appreciated the level of integration of components on the processor and/or with some components being external to the processor may be one of design choice. Alternatively, rather than being implemented as circuits, all or some of the components may be implemented in software and stored in the memory 1412 of the base station 1400, with the components controlling operation of base station 1400 to implement the functions corresponding to the components when the components are executed by a processor e.g., processor 1402. In some such embodiments, the assembly of components 2300 is included in the memory 1412 as assembly of software components 1416. In still other embodiments, various components in assembly of components 2300 are implemented as a combination of hardware and software, e.g., with another circuit external to the processor providing input to the processor which then under software control operates to perform a portion of a component's function.

When implemented in software the components include code, which when executed by a processor, e.g., processor 1402, configure the processor to implement the function corresponding to the component. In embodiments where the assembly of components 2300 is stored in the memory 1412, the memory 1412 is a computer program product comprising a computer readable medium comprising code, e.g., individual code for each component, for causing at least one computer, e.g., processor 1402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 21 control and/or configure the base station 1400 or elements therein such as the processor 1402, to perform the functions of corresponding steps illustrated and/or described in the method of one or more of the flowcharts, signaling diagrams and/or described with respect to any of the Figures. Thus the assembly of components 2300 includes various components that perform functions of corresponding one or more described and/or illustrated steps of an exemplary method.

Assembly of components 2300 includes a component 2302 configured to operate the cellular base station to support a NB-IoT communications link between the cellular base station and an access point of a non-cellular network, e.g., for use in network load managements and/or facilitating UE session handoffs between a cellular network and a non-cellular network, a component 2304 configured to operate the cellular base station to send a radio resource control (RRC) release message to the first UE device to signal the first UE device to release cellular network radio resources being used by the first UE device to support the communications session corresponding to the first UE handed over to the non-cellular network, a component 2306 configured to operate the cellular base station to receive a radio resource control release complete message from the first UE device signaling that the first UE device had released cellular radio resource it was using, and a component 2308 configured to operate the cellular base station to transition the first UE device into an idle state with respect to the cellular network.

Figure 22:
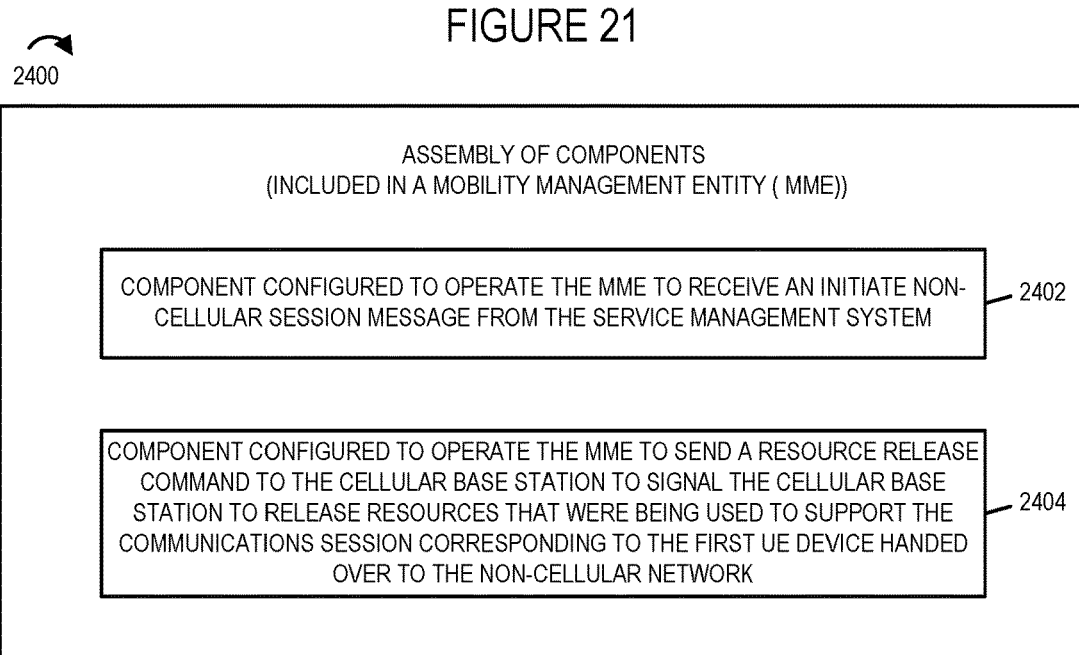
FIG. 22 is a drawing of an exemplary assembly of components which may be included in an exemplary mobility management entity (MME) in accordance with an exemplary embodiment.

FIG. 22 is a drawing of an exemplary assembly of components 2400 which may be included in an exemplary mobility management entity (MME), e.g. MME 1700 of FIG. 15, or MME 418 or FIGS. 4, 5 and 6, in accordance with an exemplary embodiment.

The components in the assembly of components 2400 can, and in some embodiments are, implemented fully in hardware within a processor, e.g., processor 1702, e.g., as individual circuits. The components in the assembly of components 2400 can, and in some embodiments are, implemented fully in hardware within the assembly of hardware components 1708, e.g., as individual circuits corresponding to the different components. In other embodiments some of the components are implemented, e.g., as circuits, within processor 1702 with other components being implemented, e.g., as circuits within assembly of components 1708, external to and coupled to the processor 1702. As should be appreciated the level of integration of components on the processor and/or with some components being external to the processor may be one of design choice. Alternatively, rather than being implemented as circuits, all or some of the components may be implemented in software and stored in the memory 1712 of the HSS 1700, with the components controlling operation of HSS 1700 to implement the functions corresponding to the components when the components are executed by a processor e.g., processor 1702. In some such embodiments, the assembly of components 2400 is included in the memory 1710 as assembly of software components 1730. In still other embodiments, various components in assembly of components 2400 are implemented as a combination of hardware and software, e.g., with another circuit external to the processor providing input to the processor which then under software control operates to perform a portion of a component's function. When implemented in software the components include code, which when executed by a processor, e.g., processor 1702, configure the processor to implement the function corresponding to the component. In embodiments where the assembly of components 2400 is stored in the memory 1710, the memory 1710 is a computer program product comprising a computer readable medium comprising code, e.g., individual code for each component, for causing at least one computer, e.g., processor 1702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 22 control and/or configure the HSS 1700 or elements therein such as the processor 1702, to perform the functions of corresponding steps illustrated and/or described in the method of one or more of the flowcharts, signaling diagrams and/or described with respect to any of the Figures. Thus the assembly of components 2400 includes various components that perform functions of corresponding one or more described and/or illustrated steps of an exemplary method.

Assembly of components 2400 includes a component 2402 configured to operate the MME to receive an initiate non-cellular session message from the service management system and a component 2404 configured to operate the MME to signal the cellular base station to release resources that were being used to support the communications session corresponding to the first UE device handed over to the non-cellular network.

Various aspects and/or features of some embodiments, but not necessarily all embodiments, of the invention are described below.

In some embodiments, there are two networks, e.g., a cellular network and a non-cellular network. In one exemplary embodiment, one network is a 3GPP LTE network and the other network is a non-3GPP network such as, e.g., a 802.11 WiFi network.

In accordance with a feature of some embodiments of the present invention, WiFi router(s) of the non-3GPP network are connected to eNodeB via NB-IoT. The eNodeB can, and sometimes does, report its capability and request a network de-congest to WiFi router(s). WiFi routers can then pick-up most of the traffic as requested and provide relief. Similarly the WiFi network gets a priori knowledge of incoming UEs and can adjust the network to accommodate the new UEs. Similarly, the WiFi network can request a de-congest if it has too many UEs on the network.

The approach of implementing and using an NB-IoT connection between the cellular base station of the cellular (e.g., 3GPP) network and the WiFi access point of the non-cellular (e.g., non 3GPP network) facilities communications between the two networks, and allows for load management between the two networks, e.g. offloading communications sessions between the two networks in response to congestion. In general, without this added NB-IoT connection between the two networks, the networks would not normally communicate with each other directly and a result uneven distribution of customers can result in capacity congestion. Thus the approach of adding the NB-IoT connection between the two networks, in accordance with a feature of the present invention, facilitates load management and efficient load balancing between the two networks.

In some embodiments, a service management system monitors both of the networks, determines congestion in the networks, makes decisions regarding offloading communications session to relive congestion, and/or controls session handoffs between the two networks. In various embodiments, network monitoring signals, control signals, and/or handoff related signaling traverse the two networks via a NB-IoT connection, e.g. between a cellular network base station and a non-cellular network access point, e.g. a WiFi AP.

Various steps and/or features of some embodiments of a Cellular (e.g., 3GPP) network to Non-Cellular (non-3GPP) network Handover of a communications session for a UE are described below.

The non-cellular network (e.g., non 3GPP network) reports its network stats and KPIs over NB-IoT which provides a direct link to a cellular network (e.g., 3 GPP network).

A services capability server/Application Server (SCS/AS) will get the statistics from the cellular network and provide commands to the MME to release UE from the network while requesting the non-cellular network to take over for congestion relief.

The UE will go into RRC idle mode over the cellular network and start communication over the non-cellular network.

Various steps and/or features of some embodiments of a Non-Cellular (e.g., non-3GPP) network to a Cellular (e.g., 3GPP) network Handover of a communications session for a UE are described below.

The cellular network (e.g., 3GPP network) reports its network stats and KPIs over NB-IoT, and the cellular network also gets network stats from the non-cellular network.

The services capability server/Application server (SCS/AS) will get the statistics from the non-cellular network and provide commands to the MME to take over while the non-cellular network relinquishes the UE.

The UE will go into Disassociated mode over the non-cellular network (e.g., non-3GPP network) and start communicating over the cellular network (e.g., 3GPP network).

Various benefits of using NB-IoT in accordance with a feature of various embodiments of the present invention are described below.

Extended Discontinuous reception (eDRX) allows for extended battery life. This is preferred over a connection manager on the phone that generally consumes a lot of battery power.

NB-IoT allows up to a 30 dB better link budget and therefore has a better penetration and reach that may not be offered by a broadband 3GPP network or a non-3GPP network.

NB-IoT allows a 3GPP network to be in better control of the network and therefore better resource management directly by the network entities.

NB-IoT performs activates in parallel and therefore improves network accessibility, retainability and other KPIs.

In addition NB-IoT allows freeing up resources that would otherwise be tied up for reporting purposes.

Numbered List of Exemplary Method Embodiments:

Method Embodiment 1 A communications method comprising: operating (600 or 906) a service management system (414) to receive first network performance information (key performance indicators and/or non-cellular network statistics) from a non-cellular network (e.g., WiFi network) (410) providing performance information relating to a first user equipment device (first UE device)(451); operating (624 or 912) the service management system (414) to initiate a cellular (3GPP) communications session for the first user equipment device (UE device) (451); and operating (666 or 914) the service management system (414) to initiate release of non-cellular network resources following establishment of a cellular communications session for said first UE device (451).

Method Embodiment 2 The method of Method Embodiment 1, wherein operating (600 or 904) the service management system (414) to receive first network performance information from a non-cellular network (410) includes: receiving (600 or 908) said first network performance information via a narrowband Internet-of-Things (IoT) connection (452) between an access point (AP) (402) in said non-cellular network (410) and a base station (404) in said cellular network (412) (signal 580*c* over 452).

Method Embodiment 3 The method of Method Embodiment 1, further comprising: operating (622 or 910) the service management system (414) to determine from the first network performance information that the first UE device (451) is suffering from network congestion on the non-cellular network (410); and wherein operating (666 or 914) the service management system (414) to initiate a cellular (3GPP) communications session for the first user equipment device (UE device) (451) is performed in response to determining (622 or 910) that that the first UE device (451) is suffering from network congestion on the non-cellular network (410).

Method Embodiment 4 The method of Method Embodiment 3, wherein operating (666 or 914) the service management system (414) to initiate release of non-cellular network resources following establishment of a cellular communications session for said first UE device (451) includes: communicating (666 or 916) a resource release message (668) to a wireless LAN controller (WLC) (416) in said non-cellular network (410) via a narrowband IoT connection (452) between an access point (AP) (402) in said non-cellular network (410) and a base station (404) in said cellular network (412) (signal 668*d* over 452) to initiate release of resources being used by said first UE device (451) in said non-cellular network (412).

Method Embodiment 5 The method of Method Embodiment 4, further comprising: operating (692 or 918) the wireless LAN controller (416) in said non-cellular network (410) to respond to the resource release message by signaling (send congestion relief command 693) an access point (402) serving the first UE device (451) to release communications resources being used by said first UE device (451).

Method Embodiment 6 The method of Method Embodiment 5, further comprising: operating (554 or 904) the service management system (414) to request, via the narrowband IoT connection (452) between the access point (AP) (402) in said non-cellular network (410) and the base station (404) in said cellular network (412), non-cellular network performance information (Request UE KPIs) relating to said first UE device (451) (signal 562*d* over 452) prior to initiation of the cellular (3GPP) communications session for the first user equipment device (UE device) (451).

Method Embodiment 7 The method of Method Embodiment 1, further comprising: operating the service management system (414) to determine (822 or 922) from cellular network performance information that the first UE (451) is suffering from network congestion on the cellular network (412); operate the service management system (414) to send (834 or 926) an offload request (832) via a cellular base station (404) to a wireless LAN controller (416) in the non-cellular network (410).

Method Embodiment 8 The method of Method Embodiment 7, wherein the offload request (832) is communicated (928) to the wireless LAN controller (416) via a NB-IoT communications link (452) between the cellular base station (404) in the cellular network (412) and the access point (402) in the non-cellular network (410).

Method Embodiment 9 The method of Method Embodiment 8, further comprising: operating the wireless LAN controller (416) to send (846 or 930) an offload response (848) to the service management system (414) via the NB-IoT communications link (452).

Method Embodiment 10 The method of Method Embodiment 9, wherein the offload response (848) indicates the non-cellular network will accept the handover of the first UE (451), the method further comprising: operating the WLC (416) to send (862 or 932) a takeover command (864) to the non-cellular access point (402) signaling to the non-cellular access point that it is to take over one or more communications sessions corresponding to the first UE (451) that were previously being supported by cellular base station (404).

Method Embodiment 11 The method of Method Embodiment 10, further comprising, prior to the WLC sending (862 or 932) the takeover command (864) to the non-cellular access point (402): operating the service management system (414) to send (824 or 924) an initiate non-cellular session message (826) to a mobility management entity (418) to cause the mobility management entity to initiate a non-cellular session for the first UE (451) to allow the non-cellular network (410) to take over a communications session corresponding to the first UE (451) from the cellular network (412).

Method Embodiment 12 The method of Method Embodiment 11, further comprising: operating the mobility management entity (418) to send (874 or 936) a resource release command (876) to the cellular base station (404) to signal the cellular base station (404) to release resources that were being used to support the communications session corresponding to the first UE (451) handed over to the non-cellular network (410).

Method Embodiment 13 The method of Method Embodiment 12, further comprising: operating the cellular base station (404) to send (890 or 938) a radio resource control (RRC) release message (892) to the first UE (451) to signal the first UE (451) to release cellular network radio resources being used by the first UE (451) to support the communications session corresponding to the first UE (451) handed over to the non-cellular network (410).

Method Embodiment 14 The method of Method Embodiment 13, further comprising: operating the cellular base station (404) to receive (898 or 938) a radio resource control release complete message (896) from the first UE (451) signaling that the first UE (451) has released cellular radio resources it was using; and operating the cellular base station (404) to transition (898 or 940) the first UE (451) into an idle state with respect to the cellular network (412).

Method Embodiment 15 The method of Method Embodiment 14, further comprising: operating the access point (402) to participate (870 or 934) in a data session which was handed off from the cellular network (412).

Numbered List of Exemplary System Embodiments:

System Embodiment 1 A communications system (400) comprising: a service management system (414) including: a server (SC S/AS) (426) including a first processor (1002); and a first device (SCEF device) (424) including a second processor (1102); and wherein said first processor (1002) is configured to: operate (600 or 906) the service management system (414) to receive first network performance information (key performance indicators and/or non-cellular network statistics) from a non-cellular network (e.g., WiFi network) (410) providing performance information relating to a first user equipment device (first UE device)(451); operate (624 or 912) the service management system (414) to initiate a cellular (3GPP) communications session for the first user equipment device (UE device) (451); and wherein said second processor (1102) is configured to: operate (666 or 914) the service management system (414) to initiate release of non-cellular network resources following establishment of a cellular communications session for said first UE device (451).

System Embodiment 2 The communications system (400) of System Embodiment 1, wherein said first processor (1002) is configured to operate the service management system (414) to receive (600 or 908) said first network performance information via a narrowband Internet-of-Things (IoT) connection (452) between an access point (AP) (402) in said non-cellular network (410) and a base station (404) in said cellular network (412) (signal 580c over 452), as part of being configured to operate (600 or 904) the service management system (414) to receive first network performance information from a non-cellular network (410).

System Embodiment 3 The communications system (400) of System Embodiment 1, wherein said first processor (1002) is further configured to: operate (622 or 910) the service management system (414) to determine from the first network performance information that the first UE device (451) is suffering from network congestion on the non-cellular network (410); and wherein operating (666 or 914) the service management system (414) to initiate a cellular (3GPP) communications session for the first user equipment device (UE device) (451) is performed in response to determining (622 or 910) that that the first UE device (451) is suffering from network congestion on the non-cellular network (410).

System Embodiment 4 The communications system (400), of System Embodiment 3, wherein said second processor (1102) is configured to: operate the service management system (414) to communicate (666 or 916) a resource release message (668) to a wireless LAN controller (WLC) (416) in said non-cellular network (410) via a narrowband IoT connection (452) between an access point (AP) (402) in said non-cellular network (410) and a base station (404) in said cellular network (412) (signal 668d over 452) to initiate release of resources being used by said first UE device (451) in said non-cellular network (412), as part of being configured to operate (666 or 914) the service management system (414) to initiate release of non-cellular network resources following establishment of a cellular communications session for said first UE device (451).

System Embodiment 5 The communications system (400) of System Embodiment 4, further comprising: said non-cellular network (410) including said wireless LAN controller (WLC) (416) including a third processor (1302); and wherein said third processor (1302) is configured to: operate (692 or 918) the wireless LAN controller (416) in said non-cellular network (410) to respond to the resource release message by signaling (send congestion relief command 693) an access point (402) serving the first UE device (451) to release communications resources being used by said first UE device (451).

System Embodiment 6 The communications system (400) of System Embodiment 5, wherein said first processor (1002) is further configured to: operate (554 or 904) the service management system (414) to request, via the narrowband IoT connection (452) between the access point (AP) (402) in said non-cellular network (410) and the base station (404) in said cellular network (412), non-cellular network performance information (Request UE KPIs) relating to said first UE device (451) (signal 562d over 452) prior to initiation of the cellular (3GPP) communications session for the first user equipment device (UE device) (451).

System Embodiment 7 The communications system (400) of System Embodiment 1, wherein said first processor (1002) is further configured to: operate the service management system (414) to determine (822 or 922) from cellular network performance information that the first UE (451) is suffering from network congestion on the cellular network (412); and wherein said second processor (1102) is further configured to: operate the service management system (414) to send (834 or 926) an offload request (832) via a cellular base station (404) to a wireless LAN controller (416) in the non-cellular network (410).

System Embodiment 8 The communications system (400) of System Embodiment 7, wherein the offload request (832) is communicated (928) to the wireless LAN controller (416) via a NB-IoT communications link (452) between the cellular base station (404) in the cellular network (412) and the access point (402) in the non-cellular network (410).

System Embodiment 9 The communications system (400) of System Embodiment 8, wherein said third processor (1302) is further configured to: operate the wireless LAN controller (416) to send (846 or 930) an offload response (848) to the service management system (414) via the NB-IoT communications link (452).

System Embodiment 10 The communications system (400) of System Embodiment 9, wherein the offload response (848) indicates the non-cellular network will accept the handover of the first UE (451); and wherein said third processor (1302) is further configured to: operate the WLC (416) to send (862 or 932) a takeover command (864) to the non-cellular access point (402) signaling to the non-cellular access point that it is to take over one or more communications sessions corresponding to the first UE (451) that were previously being supported by cellular base station (404).

System Embodiment 11 The communications system (400) of System Embodiment 10, wherein said first processor (1002) is further configured to: operate the service management system (414) to send (824 or 924) an initiate non-cellular session message (826) to a mobility management entity (418) to cause the mobility management entity to initiate a non-cellular session for the first UE (451) to allow the non-cellular network (410) to take over a communications session corresponding to the first UE (451) from the cellular network (412), said sending of the initiate non-cellular session message (826) being prior to the WLC sending (862 or 932) the takeover command (864) to the non-cellular access point (402).

System Embodiment 12 The communications system (400) of System Embodiment 11, further comprising: said cellular network (414) including said mobility management entity (414) including a fourth processor (1202), wherein said fourth processor (1202) is configured to: operate the mobility management entity (418) to send (874 or 936) a resource release command (876) to the cellular base station (404) to signal the cellular base station (404) to release resources that were being used to support the communications session corresponding to the first UE (451) handed over to the non-cellular network (410).

System Embodiment 13 The communications system (400) of System Embodiment 12, further comprising said cellular base station (404) including a fifth processor (1402), wherein said fifth processor (1402) is configured to: operate the cellular base station (404) to send (890 or 938) a radio resource control (RRC) release message (892) to the first UE (451) to signal the first UE (451) to release cellular network radio resources being used by the first UE (451) to support the communications session corresponding to the first UE (451) handed over to the non-cellular network (410).

System Embodiment 14 The communications system (400) of System Embodiment 13, wherein said fifth processor (1402) is further configured to: operate the cellular base station (404) to receive (898 or 938) a radio resource control release complete message (896) from the first UE (451) signaling that the first UE (451) has released cellular radio resources it was using; and operate the cellular base station (404) to transition (898 or 940) the first UE (451) into an idle state with respect to the cellular network (412).

System Embodiment 15 The communications system (400) of System Embodiment 14, further comprising: said access point (402) including a sixth processor (1502); and wherein said sixth processor (1502) is configured to: operate the access point (402) to participate (870 or 934) in a data session which was handed off from the cellular network (412).

Numbered List of Exemplary Non-Transitory Computer Readable Medium Embodiments:

Non-Transitory Computer Readable Medium Embodiment 1 A non-transitory computer readable medium (1010) including computer executable instructions which when executed by a processor (1002) of a server (SCS/AS) (426) included in a service management system (414) cause the server (426) to perform the steps of: operating (600 or 906) the service management system (414) to receive first network performance information (key performance indicators and/or non-cellular network statistics) from a non-cellular network (e.g., WiFi network) (410) providing performance information relating to a first user equipment device (first UE device)(451); and operating (624 or 912) the service management system (414) to initiate a cellular (3GPP) communications session for the first user equipment (UE device) (451).

Non-Transitory Computer Readable Medium Embodiment 2 A non-transitory computer readable medium (1110) including computer executable instructions which when executed by a processor (1102) of a device (SCEF device) (424) included in a service management system (414) cause the device (426) to perform the steps of: operating (666 or 914) the service management system (414) to initiate release of non-cellular network resources following establishment of a cellular communications session for said first UE device (451).

Various embodiments are directed to apparatus, e.g., service capabilities exposure function (SCEF) devices, service capability server (SCSs), application server (ASs), SCS/AS devices, user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, an AMF device, servers, customer premises equipment devices, cable systems, non-cellular networks, cellular networks, service management systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating service capabilities exposure function (SCEF) devices, service capability server (SCSs), application server (ASs), SCS/AS devices, user devices such as a user equipment (UE) device, base stations, e.g. cellular base stations (macro cell base stations and small cell base stations) such as a eNB or gNB or ng-eNB, non-cellular network access points, e.g. WiFi APs, network nodes, mobility management entity (MME), home subscriber server (HSS), wireless local area network controller (WLC), gateways, e.g. S-GW, P-GW, S-GW/P-GW, user devices, base stations, gateways, servers, cable networks, cloud networks, nodes, servers, cloud service servers, customer premises equipment devices, controllers, network monitoring nodes/servers and/or cable or network equipment devices. Various embodiments are also directed to methods, e.g., method of controlling and/or operating a communications system including a cellular network, a non-cellular network, a NB-IoT communications link between the cellular and non-cellular network and a service management system. Various embodiments are also directed to methods, e.g., method of controlling and/or operating a service management device or a service management system. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a service capabilities exposure function (SCEF) device, a service capability server (SCS), application server (AS), SCS/AS device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., said device including a processor configured to implement one, multiple or all of the steps of one or more methods of the invention.

In some embodiments, the processor or processors, e.g., CPUs, of one or more devices, e.g., a service capabilities exposure function (SCEF) device, a service capability server (SCS), application server (AS), SCS/AS device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, 5-GW/P-GW, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a service capabilities exposure function (SCEF) device, a service capability server (SCS), application server (AS), SCS/AS device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a component corresponding to each of one or more of the steps of the various described methods performed by the device in which the processor is included. In some but not all embodiments a device, e.g., a service capabilities exposure function (SCEF) device, a service capability server (SCS), application server (AS), SCS/AS device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a service capabilities exposure function (SCEF) device, a service capability server (SCS), application server (AS), SCS/AS device, user device such as a user equipment (UE) device, base stations, e.g. cellular base station supporting NB-IoT (macro cell base station or small cell base station) such as a eNB or gNB or ng-eNB, non-cellular network access point supporting NB-IoT, e.g. WiFi AP supporting NB-IoT, network node, mobility management entity (MME) node, home subscriber server (HSS), wireless local area network controller (WLC), gateway, e.g. S-GW, P-GW, S-GW/P-GW, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
operating a service management system to receive first network performance information from a non-cellular network providing performance information relating to a first user equipment (UE) device, wherein operating the service management system to receive first network performance information from a non-cellular network includes:
receiving said first network performance information via a narrowband Internet-of-Things (NB-IoT) connection between an access point in said non-cellular network and a base station in a cellular network;
operating the service management system to initiate a cellular communications session for the first UE device; and
operating the service management system to initiate release of non-cellular network resources following establishment of a cellular communications session for said first UE device.

2. The method of claim 1, further comprising:
operating the service management system to determine from the first network performance information that the first UE device is suffering from network congestion on the non-cellular network; and
wherein operating the service management system to initiate a cellular communications session for the first user equipment device is performed in response to determining that that the first UE device is suffering from network congestion on the non-cellular network.

3. The method of claim 2, wherein operating the service management system to initiate release of non-cellular network resources following establishment of a cellular communications session for said first UE device includes:
communicating a resource release message to a wireless local area network (LAN) controller (WLC) in said non-cellular network via a NB-IoT connection between an access point in said non-cellular network and a base station in said cellular network to initiate release of resources being used by said first UE device in said non-cellular network.

4. The method of claim 3, further comprising:
operating the WLC in said non-cellular network to respond to the resource release message by signaling an access point serving the first UE device to release communications resources being used by said first UE device.

5. The method of claim 4, further comprising:
operating the service management system to request, via the NB-IoT connection between the access point in said non-cellular network and the base station in said cellular network, non-cellular network performance information relating to said first UE device prior to initiation of the cellular communications session for the first user equipment device.

6. The method of claim 3, wherein the NB-IoT connection between the access point (AP) in said non-cellular network and a base station in said cellular network is between a NB-IoT interface in the access point and a NB-IoT interface in the base station.

7. The method of claim 1, further comprising:
operating the service management system to determine from cellular network performance information that the first UE device is suffering from network congestion on the cellular network; and
operating the service management system to send an offload request via a cellular base station to a wireless local area network (LAN) controller (WLC) in the non-cellular network.

8. The method of claim 7, wherein the offload request is communicated to the WLC via a NB-IoT communications link between the cellular base station in the cellular network and the access point in the non-cellular network.

9. The method of claim 8, further comprising:
operating the WLC to send an offload response to the service management system via the NB-IoT communications link.

10. The method of claim 9, wherein the offload response indicates the non-cellular network will accept the handover of the first UE device, the method further comprising:
operating the WLC to send a takeover command to the non-cellular access point signaling to the non-cellular access point that it is to take over one or more communications sessions corresponding to the first UE device that were previously being supported by cellular base station.

11. The method of claim 10, further comprising, prior to the WLC sending the takeover command to the non-cellular access point:
operating the service management system to send an initiate non-cellular session message to a mobility management entity to cause the mobility management entity to initiate a non-cellular session for the first UE device to allow the non-cellular network to take over a communications session corresponding to the first UE device from the cellular network.

12. The method of claim 11, further comprising:
operating the mobility management entity to send a resource release command to the cellular base station to signal the cellular base station to release resources that were being used to support the communications session corresponding to the first UE device handed over to the non-cellular network.

13. The method of claim 1, wherein operating the service management system to initiate release of non-cellular network resources includes:
operating the service management system to send an initiate release signal to the cellular base station; and
wherein the method further includes operating the cellular base station to send an initiate release signal via an NB-IoT interface to the non-cellular network.

14. The method of claim 1, further comprising:
operating the non-cellular access point to communicate non-cellular network status information via an NB-IoT interface in the non-cellular access point; and
operating the non-cellular access point to communicate data session signals to the first UE device via a WIFI interface in the access point.

15. A communications system comprising:
a service management system including:
a server including a first processor; and
a first device including a second processor; and
wherein said first processor is configured to:
operate the service management system to receive first network performance information from a non-cellular network providing performance information relating to a first user equipment (UE) device; and
operate the service management system to initiate a cellular communications session for the first UE device; and
wherein said second processor is configured to:
operate the service management system to initiate release of non-cellular network resources following establishment of a cellular communications session for said first UE device; and
wherein said first processor is configured to operate the service management system to receive said first network performance information via a narrowband Internet-of-Things (NB-IoT) connection between an access point in said non-cellular network and a base station in a cellular network, as part of being configured to operate the service management system to receive first network performance information from a non-cellular network.

16. The communications system of claim 15, wherein said first processor is further configured to:
operate the service management system to determine from the first network performance information that the first UE device is suffering from network congestion on the non-cellular network; and
wherein operating the service management system to initiate a cellular communications session for the first user equipment device is performed in response to determining that that the first UE device is suffering from network congestion on the non-cellular network.

17. The communications system of claim 16, wherein said second processor is configured to:
operate the service management system to communicate a resource release message to a wireless local area network (LAN) controller (WLC) in said non-cellular network via a NB-IoT connection between an access point in said non-cellular network and a base station in said cellular network to initiate release of resources being used by said first UE device in said non-cellular network, as part of being configured to operate the service management system to initiate release of non-cellular network resources following establishment of a cellular communications session for said first UE device.

18. The communications system of claim 17, further comprising:
said non-cellular network including said WLC including a third processor; and
wherein said third processor is configured to:
operate the WLC in said non-cellular network to respond to the resource release message by signaling an access point serving the first UE device to release communications resources being used by said first UE device.

19. The communications system of claim 18, wherein said first processor is further configured to:
operate the service management system to request, via the NB-IoT connection between the access point in said non-cellular network and the base station in said cellular network, non-cellular network performance information relating to said first UE device prior to initiation of the cellular communications session for the first UE device.

20. The communications system of claim 15,
wherein said first processor is further configured to:
operate the service management system to determine from cellular network performance information that the first UE device is suffering from network congestion on the cellular network; and
wherein said second processor is further configured to:
operate the service management system to send an offload request via a cellular base station to a wireless local area network (LAN) controller (WLC) in the non-cellular network.

21. A non-transitory computer readable medium including computer executable instructions which when executed by a processor of a server included in a service management system cause the server to perform the steps of:
operating the service management system to receive first network performance information from a non-cellular network providing performance information relating to a first user equipment (UE) device, wherein operating the service management system to receive first network performance information from a non-cellular network includes:
receiving said first network performance information via a narrowband Internet-of-Things (NB-IoT) connection between an access point in said non-cellular network and a base station in a cellular network; and
operating the service management system to initiate a cellular communications session for the first user equipment device.

* * * * *